(12) United States Patent
Iwakura et al.

(10) Patent No.: US 8,111,700 B2
(45) Date of Patent: Feb. 7, 2012

(54) COMPUTER-READABLE RECORDING MEDIUM STORING PACKET IDENTIFICATION PROGRAM, PACKET IDENTIFICATION METHOD, AND PACKET IDENTIFICATION DEVICE

(75) Inventors: Hirokazu Iwakura, Kawasaki (JP); Ken Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 104 days.

(21) Appl. No.: 12/534,606

(22) Filed: Aug. 3, 2009

(65) Prior Publication Data

US 2010/0080246 A1    Apr. 1, 2010

(30) Foreign Application Priority Data

Sep. 26, 2008   (JP) ................................ 2008-248085

(51) Int. Cl.
*H04L 12/56* (2006.01)
(52) U.S. Cl. ........................................ 370/394; 370/252
(58) Field of Classification Search ......................... None
See application file for complete search history.

(56) References Cited

U.S. PATENT DOCUMENTS

| | | | | |
|---|---|---|---|---|
| 6,678,250 | B1 * | 1/2004 | Grabelsky et al. | 370/241 |
| 7,076,547 | B1 * | 7/2006 | Black | 709/224 |
| 7,246,101 | B2 * | 7/2007 | Fu et al. | 706/46 |
| 7,729,256 | B2 * | 6/2010 | Malloy et al. | 370/235 |
| 7,835,406 | B2 * | 11/2010 | Oran et al. | 370/522 |
| 2004/0111507 | A1 * | 6/2004 | Villado et al. | 709/224 |
| 2006/0174023 | A1 * | 8/2006 | Horn et al. | 709/231 |
| 2007/0022327 | A1 | 1/2007 | Otsuka et al. | |
| 2008/0052387 | A1 * | 2/2008 | Heinz et al. | 709/223 |

FOREIGN PATENT DOCUMENTS

| | | |
|---|---|---|
| JP | A 2005-328131 | 11/2005 |
| JP | A 2007-26303 | 2/2007 |

* cited by examiner

*Primary Examiner* — Donald Mills
(74) *Attorney, Agent, or Firm* — Greer, Burns & Crain, Ltd.

(57) ABSTRACT

A packet identification device has a reception unit that successively receives packets. The device has an obtaining unit that obtains, every time a packet is received, an interval of reception times between the received packet and a packet received immediately before the received packet, in the same connection as that of the received packet. The device has an identification unit that identifies the received packet as a packet containing a forefront segment of a plurality of segments constituting one message when the obtained reception time interval is higher than a predetermined threshold value.

18 Claims, 21 Drawing Sheets

FIG. 8

| SOURCE PORT NUMBER | DESTINATION PORT NUMBER |
|---|---|
| SEQUENCE NUMBER ||
| ACKNOWLEDGE NUMBER ||
| HEADER LENGTH / RESERVE / CONTROL BIT | WINDOW SIZE |
| CHECKSUM | EMERGENCY POINTER |
| EXTENSION INFORMATION ||

| CLASS | FREQUENCY |
|---|---|
| 0.00000sec − 0.00001sec | 1 |
| 0.00001sec − 0.00002sec | 11 |
| 0.00002sec − 0.00003sec | 125 |
| 0.00003sec − 0.00004sec | 1743 |
| ⋮ | ⋮ |
| 0.00021sec − 0.00022sec | 822 |
| 0.00022sec − 0.00023sec | 367 |
| 0.00023sec − 0.00024sec | 231 |
| 0.00024sec − 0.00025sec | 184 |

COMPUTER-READABLE RECORDING MEDIUM STORING PACKET IDENTIFICATION PROGRAM, PACKET IDENTIFICATION METHOD, AND PACKET IDENTIFICATION DEVICE

CROSS-REFERENCE TO RELATED APPLICATIONS

This application is based upon and claims the benefit of priority of the prior Japanese Patent Application No. 2008-248085, filed on Sep. 26, 2008, the entire contents of which are incorporated herein by reference.

FIELD

The technical field relates to an art for identifying a predetermined packet.

BACKGROUND

As is well known, there is a piece of software for visualizing the status of communication between a plurality of computers connected through an IP (internet protocol) network. A computer where this piece of software is installed receives copies of packets flowing between a plurality of computers to be monitored, and displays the contents of the received packets as they are received. Moreover, the computer where this piece of software is installed displays protocols described in the packets, or information on addresses, after converting them into a format that is easy-to-understand for the user, or extracts a packet conforming to a specific condition and performs statistical processing thereon to display a diagram or a graph. Moreover, the computer where this piece of software is installed sometimes ladder-displays a TCP (transmission control protocol) connection establishment sequence or message exchanges based on the received packets. Here, the message is one obtained by performing reassembly into an original form based on segments that are left when the IP header and the TCP header are removed, and refers to a unit of transmission of a communication layer higher than the TCP.

When reassembling a message based on segments in a plurality of packets, the computer where the piece of software is installed reads, from the forefront segment, the value of a "message length" field in the message header included in the message. And the computer where the piece of software is installed identifies all the packets that are necessary to reassemble one message, based on the read value.

The reception of copies of packets flowing between a plurality of computers to be monitored is normally implemented by a port mirroring function of a LAN (local area network) switch. The port mirroring function is for copying packets that pass through a specific communication port and transmitting them from a mirror port. The computer where the above-mentioned piece of software is installed is connected to the mirror port of the LAN switch to which a plurality of computers to be monitored are both connected.

With this LAN switch, if the throughput (processability per unit time) of the mirror port exceeds its limit, a packet loss (disappearance of a packet) occurs. Even if all the copied packets are sent out to the computer where the piece of software is installed, a packet loss sometimes occurs because of the computer not having sufficient resources.

For this reason, when message reassembly is performed based on segments in a plurality of packets, if the forefront packet containing the "message length" field is lost due to a packet loss, it cannot be determined which continuous ones of the succeeding packets constitute one message. Consequently, message reassembly cannot be performed.

The art disclosed in the present specification is made in view of the above-mentioned problem of the related art, and an object thereof is to enable the identification of the packet containing the forefront segment even after a packet loss occurs.

SUMMARY

According to an aspect of the invention, a packet identification device has a reception unit that successively receives packets. The device has an obtaining unit that obtains, every time a packet is received, an interval of reception times between the received packet and a packet received immediately before the received packet, in the same connection as that of the received packet. The device has an identification unit that identifies the received packet as a packet containing a forefront segment of a plurality of segments constituting one message when the obtained reception time interval is higher than a predetermined threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 8 illustrates a TCP header format;

FIG. 12 schematically illustrates a frequency table;

DESCRIPTION OF EMBODIMENTS

Hereinafter, a computer network system as an embodiment of the previously disclosed packet identification program will be described with reference to the attached drawings.

<<Structure>>

Figure 1:
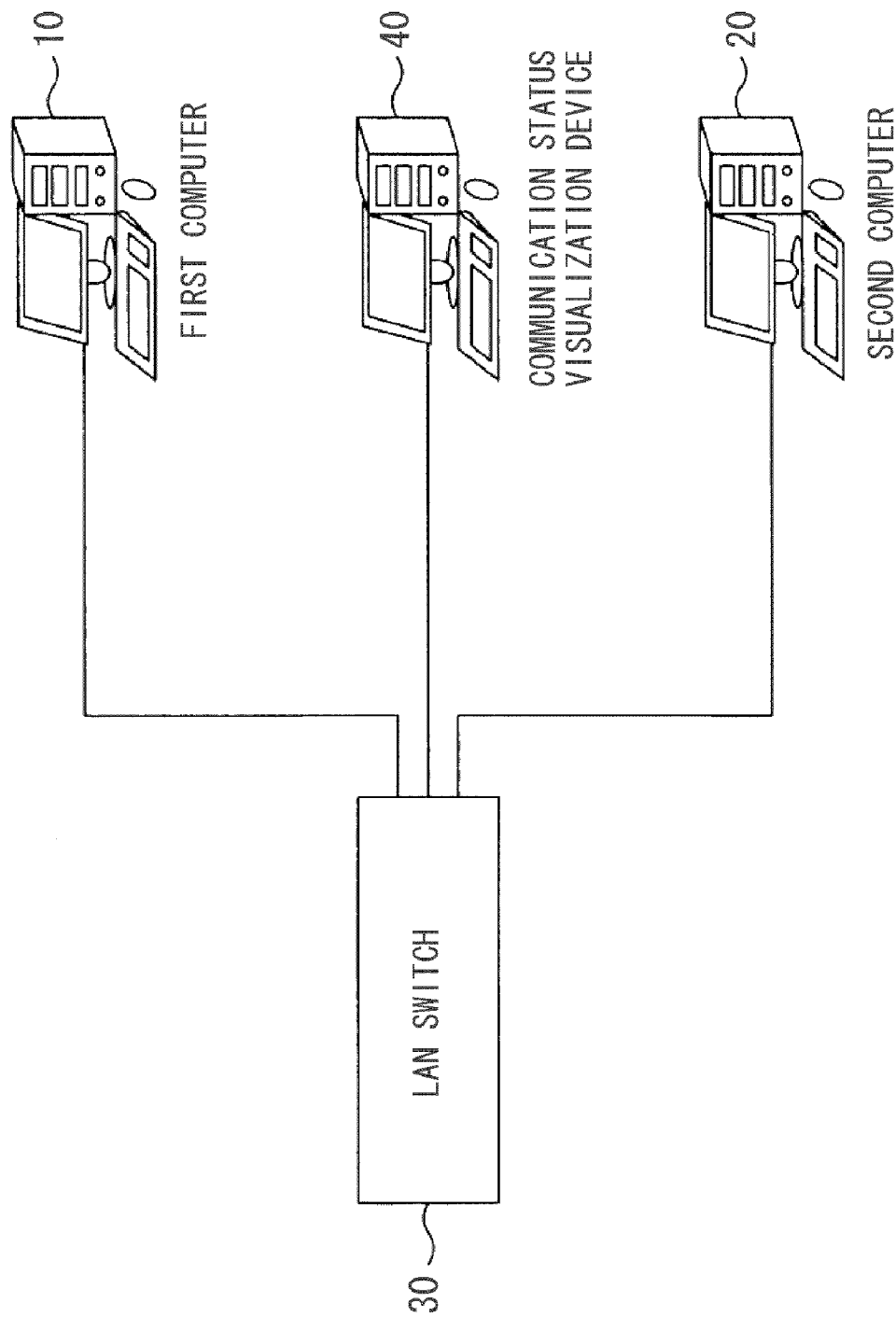
FIG. 1 illustrates the structure of a computer network system of an embodiment of the present invention.

FIG. 1 illustrates the structure of a computer network system of the present embodiment.

The computer network system of the present embodiment includes first and second computers 10 and 20, a LAN switch 30 and a communication status visualization device 40.

The first and second computers 10 and 20 are both general computers having the function of exchanging packets with each other. Here, the packet is the unit of transmission in the Internet layer in the TCP/IP (transmission control protocol/internet protocol) model which is one of the communication models. The LAN switch 30 is a relay device that performs packet transmission line switching. As shown in FIG. 1, the first and second computers 10 and 20 are both connected to the LAN switch 30. The communication status visualization device 40 is for obtaining packets exchanged between a plurality of computers, through the LAN switch 30, and visualizing the status of the communication based on the obtained packets. In the present embodiment, the first and second computers 10 and 20 are to be monitored by the communication status visualization device 40. While the number of objects to be monitored by the communication status visualization device 40 is two in FIG. 1, it may be three or more.

Figure 2:
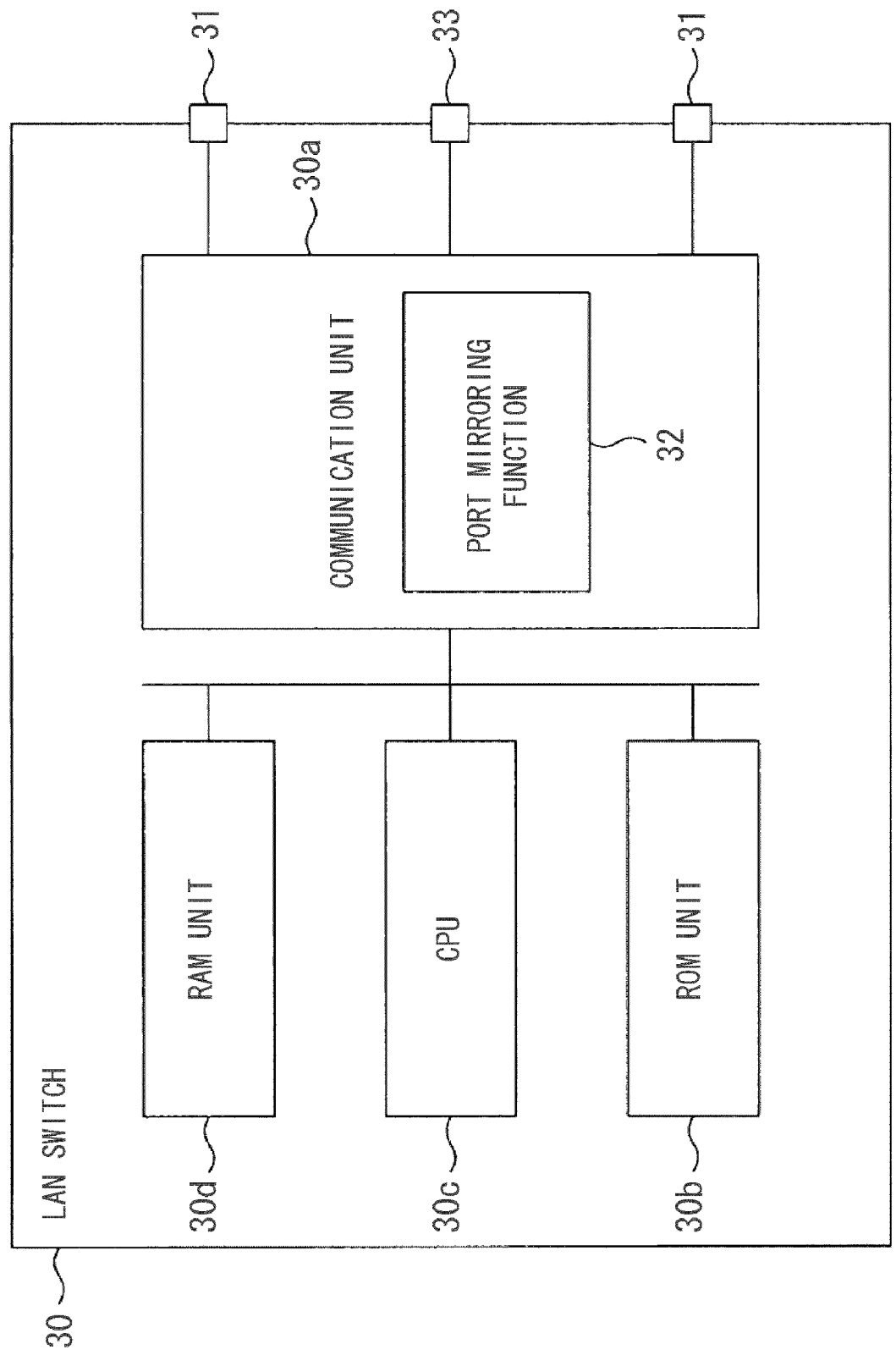
FIG. 2 illustrates the structure of a LAN switch.

FIG. 2 illustrates the structure of the LAN switch 30.

The LAN switch 30 includes a communication unit 30a, a ROM (read only memory) unit 30b, a CPU (central processing unit) 30c and a RAM (random access memory) unit 30d.

The communication unit 30a is for exchanging packets with a computer or a relay device. The communication unit 30a has a plurality of communication ports 31. When a packet enters through one communication port 31, the communication unit 30a selects a communication port 31 appropriate as the destination of the packet, and sends out the packet from the selected communication port 31. The first and second computers 10 and 20 are connected to these communication ports 31, respectively. While only two communication ports 31 are shown in FIG. 2, the communication unit 30a may have three or more communication ports 31. The communication unit 30a includes a circuit for implementing a port mirroring function 32. The port mirroring function 32 is for copying packets that pass through a specific communication port 31 and sending out the copied packets from a mirror port 33. In the present embodiment, the communication unit 30a has one mirror port 33, and the port mirroring function 32 copies all the packets entering through the two communication ports 31 and outputs the copied packets from the mirror port 33. The original packets from which the copies are made are sent out from an appropriate communication port 31 as mentioned above. In the present embodiment, the communication status visualization device 40 is connected to the mirror port 33.

The ROM unit 30b stores a program for controlling the communication unit 30a and various pieces of setting data. The CPU 30c performs processing according to the program in the ROM unit 30b. The RAM unit 30d is for the CPU 30c to cache the program or data or develop the work area.

Figure 3:
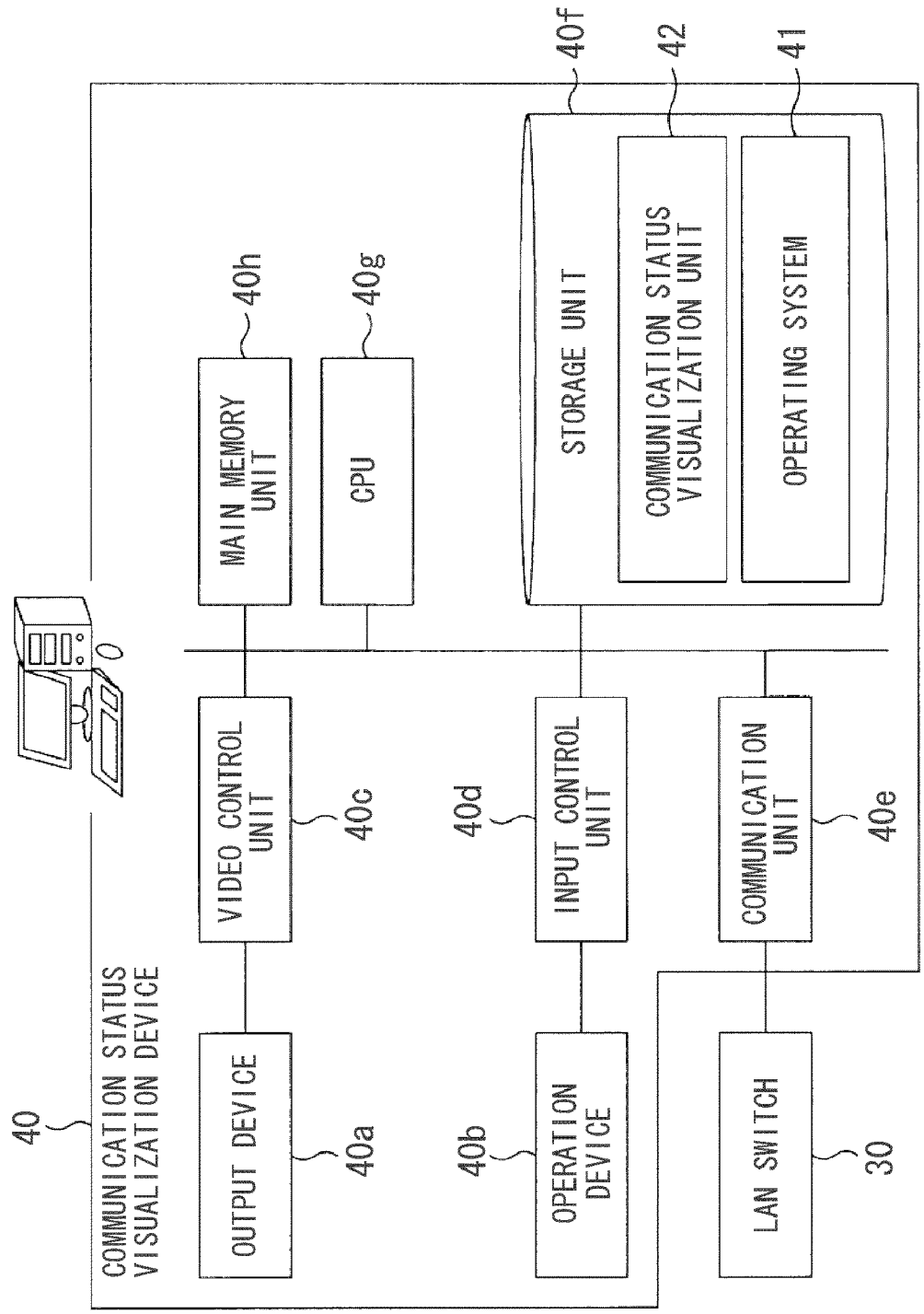
FIG. 3 illustrates the structure of a communication status visualization device.

FIG. 3 illustrates the structure of the communication status visualization device 40.

The communication status visualization device 40 is a computer provided with the function of visualizing the status of communication between the computers 10 and 20 to be monitored. The communication status visualization device 40 includes an output device 40a such as a display, an operation device 40b such as a keyboard and a mouse, and a main unit to which the devices 40a and 40b are connected. The main unit includes a video control unit 40c, an input control unit 40d, a communication unit 40e, a storage unit 40f, a CPU 40g and a main memory unit 40h.

In the communication status visualization device 40, at least an operating system 41 and a communication status visualization unit 42 are stored in the storage unit 40f.

The operating system 41 performs mediation between software and hardware, memory space management, file management, process and task management, and the like. The operating system 41 includes a driver (41a in FIG. 4) for controlling the operation of the communication unit 40e. The operating system 41 may include a non-illustrated TCP/IP suite. The TCP/IP suite is a program for exchanging packets with the TCP/IP suite of another computer connected through the communication unit 40e, according to the TCP/IP. In the present embodiment, the TCP/IP suite included in the operating system 41 is not used.

Figure 4:
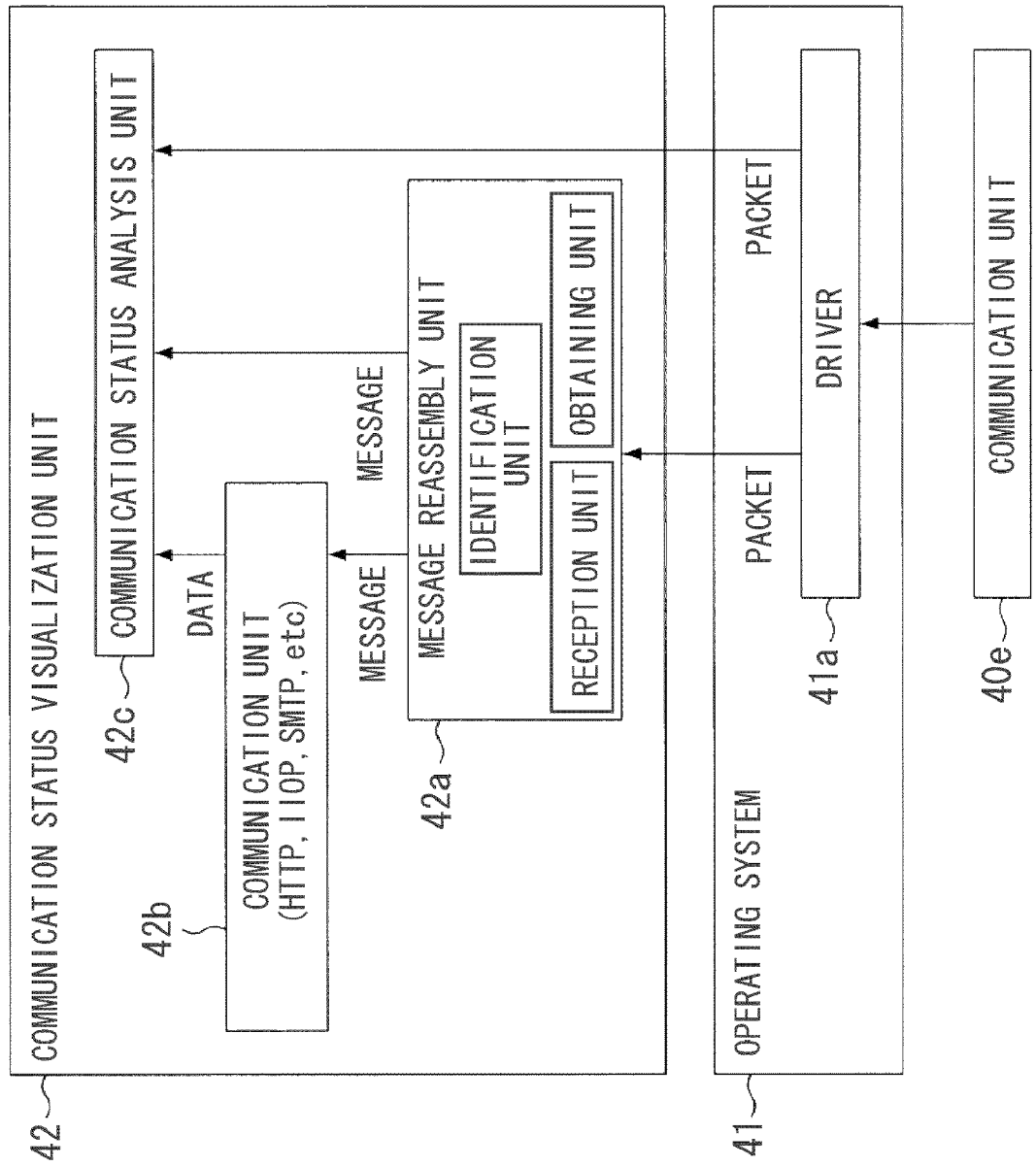
FIG. 4 illustrates the structure of a communication status visualization unit.

FIG. 4 illustrates the structure of the communication status visualization unit 42.

The communication status visualization software 42 is for adding, to a computer, the function of visualizing the status of communication between the computers 10 and 20 to be monitored. Specifically, the communication status visualization software 42 has the function of displaying the contents of packets flowing between the computers 10 and 20 to be monitored, in response to a request from the user. The communication status visualization software 42 also has the function of displaying the protocols described in the packets or information on addresses after converting them into a format that is easy-to-understand for the user, and the function of extracting a packet conforming to a specific condition and performing statistical processing thereon to display a diagram or a graph. The communication status visualization software 42 further includes the function of ladder-displaying a TCP connection establishment sequence or message exchanges based on the received packets. To implement these functions, the communication status visualization software 42 includes a message reassembly unit 42a, a communication unit 42b and a communication status analysis unit 42c.

The message reassembly unit 42a is a processing unit for performing message reassembly based on segments that are left when the IP header and the TCP header are removed from a packet. Here, the message is a unit of transmission in the application layer which is a communication layer higher than the transport layer in the above-mentioned TCP/IP model. As shown in FIG. 4, the message reassembly unit 42a directly receives packets from the driver 41a in the operating system 41 without the mediation of the non-illustrated TCP/IP suite. The contents of the processing executed by the message reassembly program 42a will be described later by using FIG. 10. The message reassembly unit 42a further includes a reception unit, an obtaining unit and an identification unit. The reception unit is a processing unit that successively receives packets. The obtaining unit is a processing unit that obtains, every time a packet is received, the interval between the reception times of the received packet and the packet received immediately before the reception of the packet in the same connection as that of the received packet. The identification unit is a processing unit that identifies, when the obtained reception time interval is higher than a predetermined threshold value, the received packet as the packet containing the forefront segment of a plurality of segments constituting one message.

The communication unit 42b is a processing unit for exchanging messages with the communication application of another computer connected through the communication unit 40e according to a predetermined protocol belonging to the application layer. In the present embodiment, the communication unit 42b is used to extract data by removing the header, according to a predetermined protocol, from a message generated by the message reassembly unit 42a. Examples of the predetermined protocol include the HTTP (hypertext transfer protocol), the IIOP (internet inter-ORB protocol) (a trademark of the Object Management Group), the SMTP (simple mail transfer protocol) and the FTP (file transfer protocol).

The communication status analysis unit 42c is a processing unit for generating information necessary for visualizing the status of communication between a plurality of computers to be monitored. More specifically, the communication status analysis unit 42c includes the function of performing the statistical processing for generating a diagram or a graph that the communication status visualization unit 42 provides to the user, and the function of analyzing the TCP connection establishment sequence and message exchanges necessary for ladder display. To implement these functions, the communication status analysis unit 42c is enabled to directly receive packets from the driver 41a in the operating system 41. The communication status analysis unit 42c is also enabled to receive messages and data from the message reassembly unit 42a and the communication unit 42b.

<<TCP/IP>>

Next, as a piece of knowledge necessary for understanding the contents of the processing by the message reassembly unit 42a, the contents of the typical processing related to the TCP/IP will be described.

Figure 5:
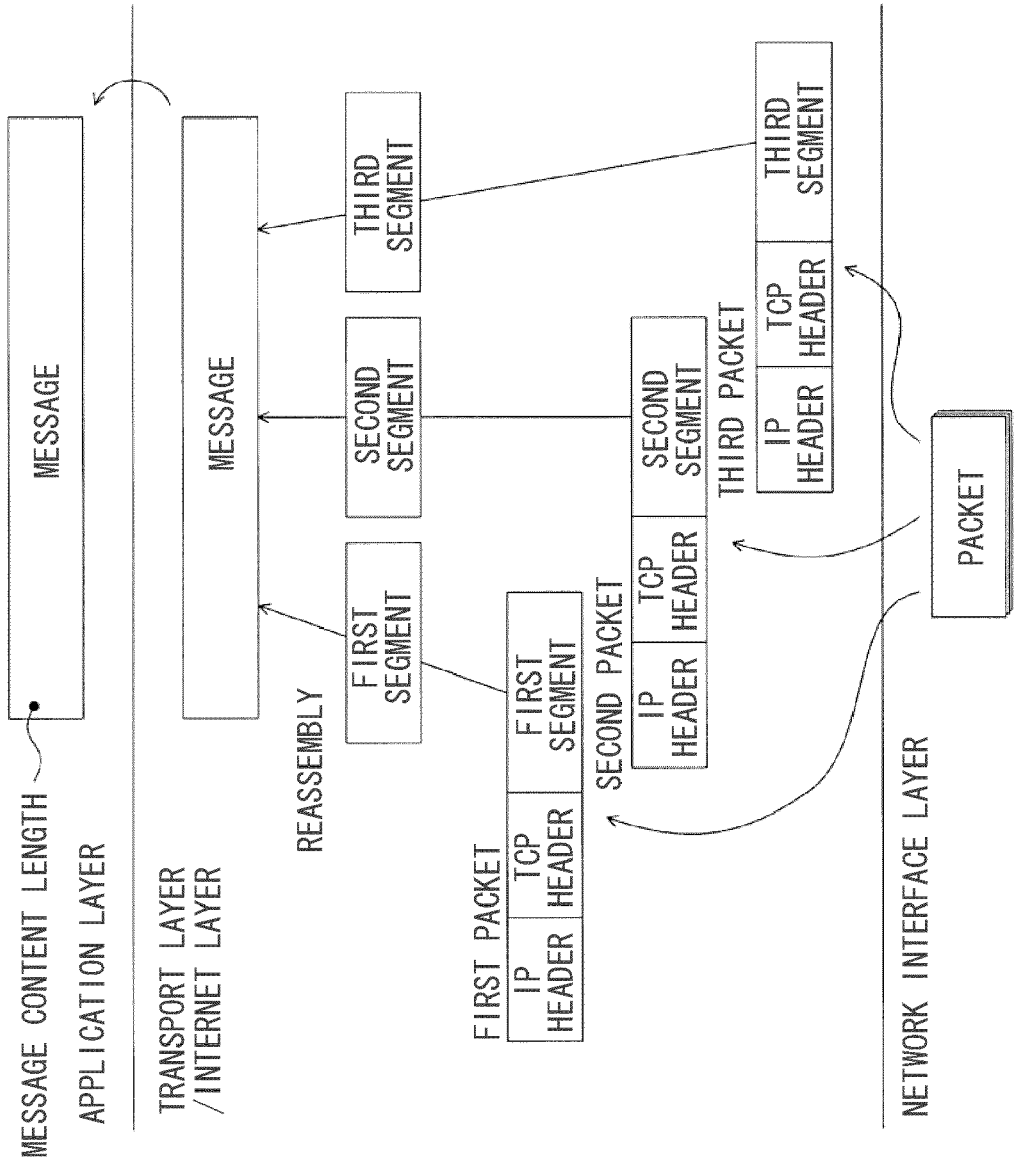
FIG. 5 illustrates an explanation of a typical message reassembly.

FIG. 5 illustrates an explanation of a typical message reassembly.

When receiving a packet from the driver (41a in FIG. 4) belonging to the network interface layer, the TCP/IP suite belonging to the transport layer and the Internet layer removes the IP header and the TCP header from the received packet in succession. Then, the TCP/IP suite transfers the remaining message to the communication application belonging to the application layer.

Moreover, when the packet is one made by adding the IP header and the TCP header to a segment obtained by dividing a message into segments, the TCP/IP suite extracts the segment from each of a plurality of packets. Then, the TCP/IP suite reassembles the message based on the extracted segments, and transfers the message to the application layer. For example, as shown in FIG. 5, when first to third packets include a first to third segments obtained by dividing one message into three segments, respectively, the TCP/IP suite removes the TCP header and the IP header from each of the first to third packets. Then, the TCP/IP suite reassembles one message based on the first to third segments that are left, and transfers the one message generated by the reassembly to the communication application belonging to the application layer.

Figure 6:
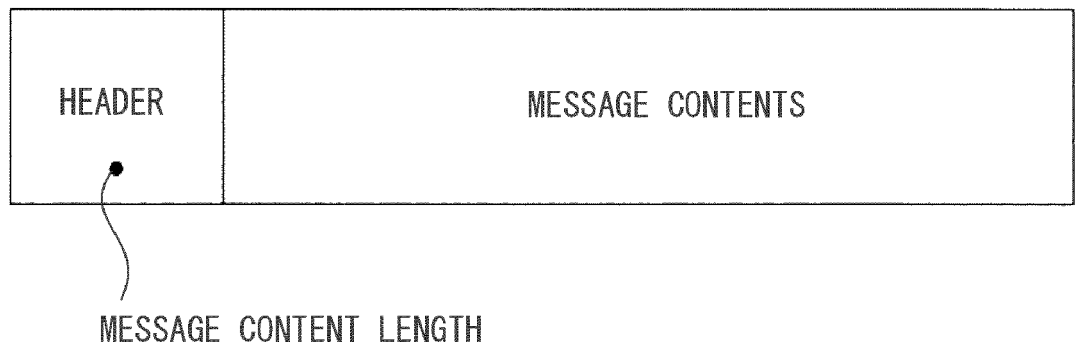
FIG. 6 illustrates the structure of a typical message.

As shown in FIG. 6, a message is constituted by a header and message contents, and in many cases, the header has a "message content length" field in which the overall size of the message contents excluding the header length is stored as the message content length. For example, in an IIOP message, the message content length is stored in the "message size" field in the header. The message length which is the overall size of a message can be obtained by summing the header length and the message content length. The message transferred from the application layer to the transport layer and the Internet layer is, when its message length is long, divided into some segments by the TCP/IP suite. When a message is divided, the message length can be calculated from the contents of the forefront segment ("the first segment" in FIG. 5).

Figure 7:
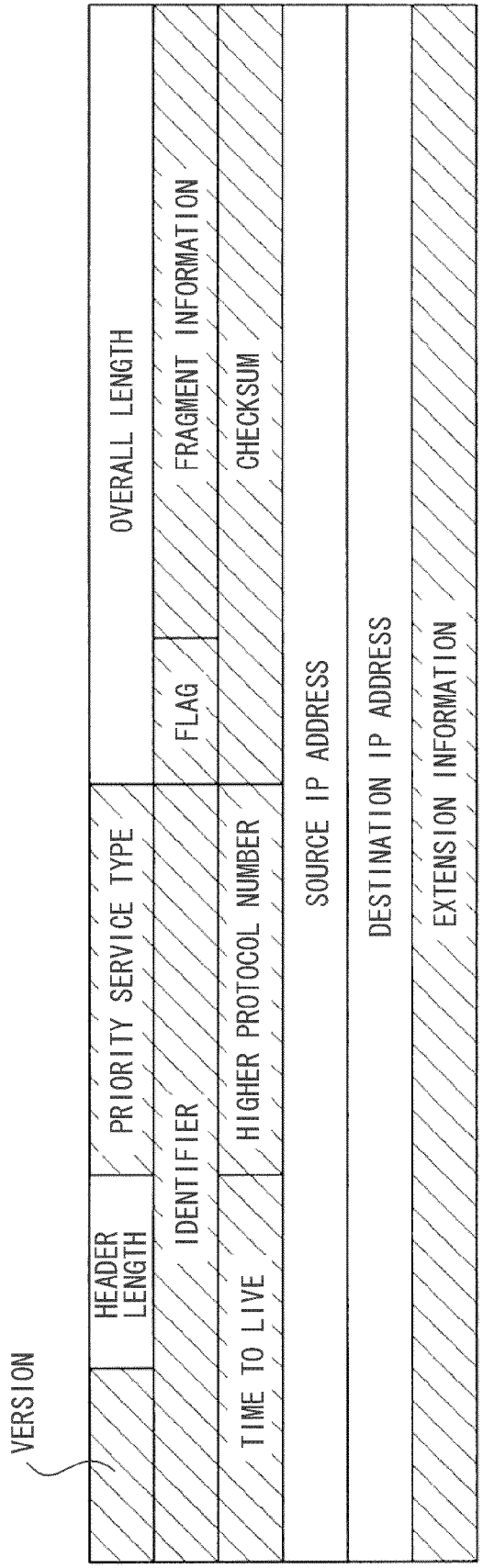
FIG. 7 illustrates an IP header format.

FIG. 7 illustrates an IP header format.

As shown in FIG. 7, the IP header includes a "header length", "overall length", "source IP address" and "destination IP address" fields. While the fields other than these fields are hatched in FIG. 7, the hatched fields will not be described because they are not used in the present embodiment. The "header length" field stores the size of the IP header. The "overall length" field stores the overall size of the packet including the IP header. The "source IP address" field stores the IP address of the computer which is the source of the packet. The "destination IP address" field stores the IP address of the computer which is the destination of the packet.

FIG. 8 illustrates a TCP header format.

As shown in FIG. 8, the TCP header includes a "source port number", "destination port number", "control bit", "sequence number", "acknowledge number" and "header length" fields. While the fields other than these fields are hatched in FIG. 8, the hatched fields will not be described because they are not used in the present embodiment. The "source port number" field stores the port number to identify the communication application that creates the message in the packet in the computer which is the source of the packet. The "destination port number" field stores the port number to identify the communication application using the message in the packet in the computer which is the destination of the packet. The "control bit" field stores six control bits representative of the kind of the packet and special control information. While the six control bits represent ON/OFF of URG (URGent), ACK (ACKnowledge), PSH (PuSH), RST (ReSeT), SYN (SYNchronize) and FIN (FINish) flags, respectively, only ACK, SYN and FIN are used in the description that follows. The "sequence number" field stores the number, assigned to the forefront byte of the segment in the packet, among the sequence numbers successively assigned to the bytes of the data that the packet transmitting end transmits to the receiving end in one TCP connection. The initial value of the sequence number is determined in a random fashion. The "acknowledge number" field stores a value expected as the sequence number of the forefront byte of the segment in the packet when, in a case where the packet is a packet where the ACK flag of the control bit in the TCP header is on (hereinafter, referred to as ACK packet), the ACK packet receiving end sends a packet next time in the same TCP connection. More specifically, this value is a value obtained by adding the segment length of the packet and 1 to the sequence number of the packet that the ACK packet transmitting end has previously received from the receiving end in the same TCP connection. The "header length" field stores the size of the TCP header.

Figure 9:
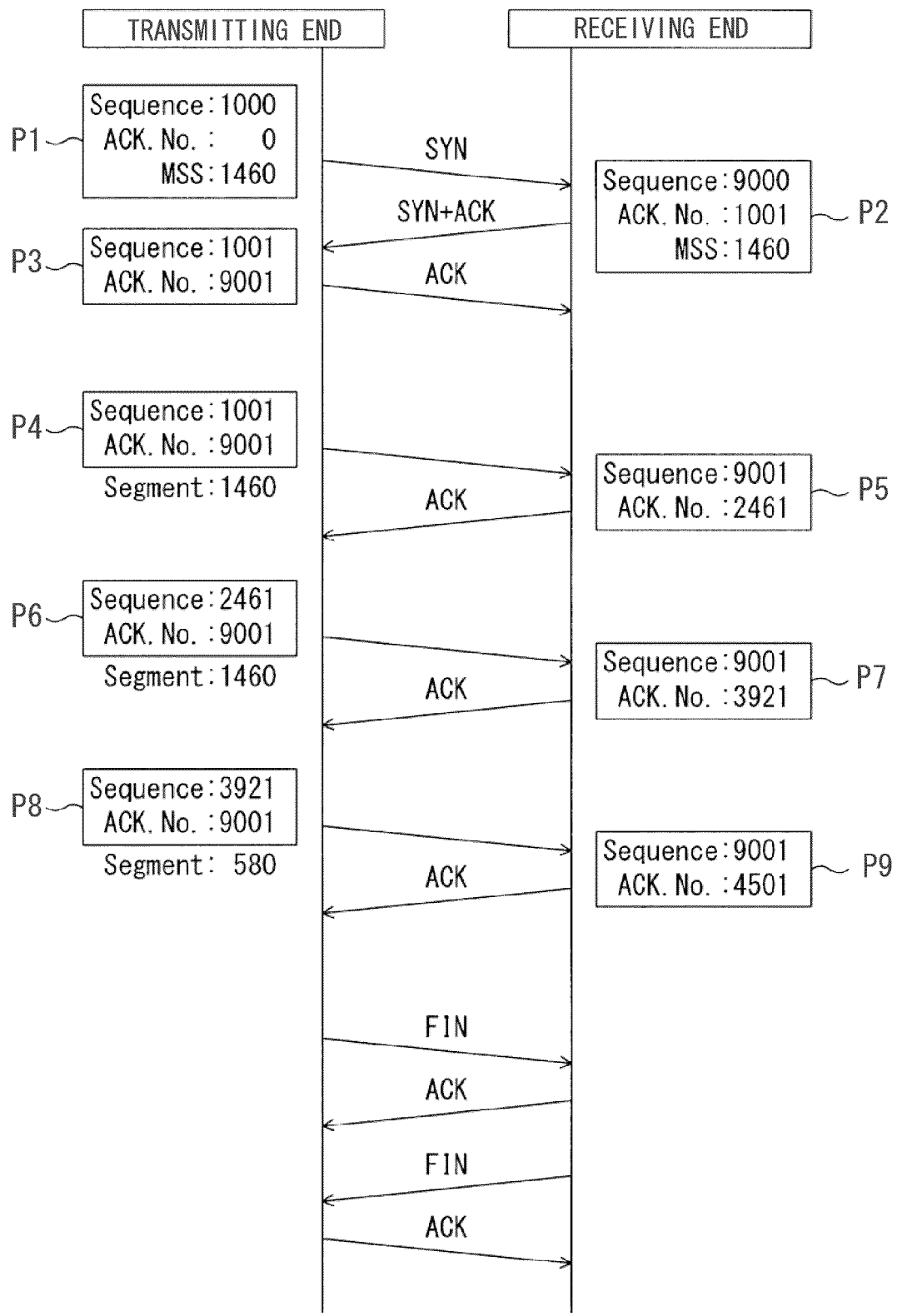
FIG. 9 illustrates an example of the sequence of a TCP connection.

FIG. 9 illustrates an example of the sequence of a TCP connection.

The transmitting computer that intends to transmit a message through a TCP connection, first, determines a random initial value (1000 in the example of FIG. 9) as the sequence number. Then, the transmitting computer generates a packet (hereinafter, referred to as SYN packet) P1 where the SYN flag of the control bit in the TCP header is on, and stores the initial value in the "sequence number" field (shown as Sequence in FIG. 9) of the TCP header. Further, the transmitting computer specifies the MSS (maximum segment size) (1460 bytes in the example of FIG. 9) in the "extension information" field of the TCP header, and transmits the SYN packet P1 to the receiving computer which is the destination of the message.

Then, the receiving computer determines a random initial value (9000 in the example of FIG. 9) as the sequence number according to the TCP. Then, the receiving computer generates a packet (hereinafter, referred to as (SYN+ACK) packet) P2 where the SYN flag and the ACK flag of the control bits in the TCP header are both on. Then, the receiving computer stores a value obtained by adding 1 to the sequence number specified by the transmitting computer in the SYN packet P1 (1001 in the example of FIG. 8) in the "acknowledge number" field (shown as Ack. No. in FIG. 9) of the TCP header. Further, the receiving computer specifies the MSS (1460 bytes in the example of FIG. 9) in the "extension information" field of the (SYN+ACK) packet P2, and transmits the (SYN+ACK) packet P2 to the transmitting computer.

Receiving this, the transmitting computer generates an ACK packet P3, and stores the same number as the acknowledge number specified by the receiving computer in the (SYN+ACK) packet P2 (1001 in the example of FIG. 9) in the "sequence number" field of the TCP header. Further, the transmitting computer stores a value obtained by adding 1 to the sequence number specified by the receiving computer in the (SYN+ACK) packet P2 (9001 in the example of FIG. 9) in the "acknowledge number" field of the TCP header, and transmits the ACK packet P3 to the receiving computer.

By the exchange (three-way handshake) of the SYN packet P1, the (SYN+ACK) packet P2 and the ACK packet P3 shown above, the TCP connection between the transmitting computer and the receiving computer is established.

Thereafter, for example, when a message of 3500 bytes is transmitted, the transmitting computer extracts, as the first segment, the MSS of bytes (1460 bytes) starting from the forefront byte of the message, and generates a packet P4 containing the extracted 1460-byte first segment. Then, the transmitting computer stores 1001 which is the same as the acknowledge number specified by the receiving computer in the (SYN+ACK) packet P2, in the "sequence number" field of the packet P4. Then, the transmitting computer stores 9001 which is the same as the sequence number of the (SYN+ACK) packet P2, in the "acknowledge number" field of the packet P4, and transmits the packet P4 to the receiving computer. The receiving computer obtains the first segment by the reception of the packet P4, and generates an ACK packet P5. Then, the receiving computer stores 9001 which is the same as the acknowledge number of the packet P4, in the "sequence number" field of the ACK packet P5. Further, the receiving computer stores, in the "acknowledge number" field of the ACK packet P5, 2461 obtained by adding the number of bytes of the entire first segment (1460) and 1 to the sequence number of the packet P4, as the value expected as the sequence number of the packet to be received next, and transmits the ACK packet P5 to the transmitting computer.

Moreover, the transmitting computer extracts, as the second segment, the MSS of bytes (1460 bytes) starting from the 1461st byte, from the 3500-byte message to be transmitted, and generates a packet P6 containing the extracted 1460-byte second segment. Then, the transmitting computer stores, in the "sequence number" field of the packet P6, 2461 obtained by adding the number of bytes of the entire first segment in the packet P4 to the sequence number specified in the immediately previously transmitted packet P4. Then, the transmitting computer stores 9001 which is the same as the packet P4, in the "acknowledge number" field of the packet P6, and transmits the packet P6 to the receiving computer. The receiving computer obtains the second segment by the reception of the packet P6, and generates an ACK packet P7. Then, the receiving computer stores 9001 which is the same as the acknowledge number of the packet P6, in the "sequence number" field of the ACK packet P7. Further, the receiving computer stores, in the "acknowledge number" field of the ACK packet P7, 3921 obtained by adding the number of bytes of the entire second segment and 1 to the sequence number of the packet P6, as the value expected as the sequence number of the packet to be received next, and transmits the ACK packet P7 to the transmitting computer.

Further, the transmitting computer extracts, as the third segment, 580 bytes starting from the 2921st byte, from the 3500-byte message to be transmitted, and generates a packet P8 containing the 580-byte third segment. Then, the transmitting computer stores, in the "sequence number" field of the packet P8, 3921 obtained by adding the number of bytes of the entire second segment in the packet P6 to the sequence number specified in the immediately previously transmitted packet P6. Then, the transmitting computer stores 9001 which is the same as the packet P6 in the "acknowledge number" field of the packet P8, and transmits the packet P8 to the receiving computer. The receiving computer obtains the third segment by the reception of the packet P8, and generates an ACK packet P9. Then, the receiving computer stores 9001 which is the same as the acknowledge number of the packet P8, in the "sequence number" field of the ACK packet P9. Further, the receiving computer stores, in the "acknowledge number" field of the ACK packet P9, 4501 obtained by adding the number of bytes of the entire third segment and 1 to the sequence number of the packet P8 as the value expected as the sequence number of the packet to be received next. Then, the receiving computer transmits the ACK packet P9 to the transmitting computer.

In the disconnection of the TCP connection, a packet where the FIN flag of the control bit in the TCP header is on and an ACK packet are exchanged.

After the TCP connection is established, the message is transmitted from the transmitting computer to the receiving computer as shown above. At this time, paying attention to the sequence numbers of the packets P4, P6 and P8 transmitted by the transmitting computer, the values obtained by adding the sizes of the segments transmitted by the packets P4, P6 and P8 to the sequence number of the ACK packet are the sequence numbers of the next ACK packets. Therefore, for the receiving computer, if the sequence number and the segment length of the received packet are found, the sequence number of the packet to be received next is found. When the sequence number of the received packet does not coincide with the sum of the sequence number and the segment length of the immediately previously received packet, the receiving computer finds the occurrence of a packet loss. Steps S141 to S143 described later use this technology.

On the basis of the above, the contents of the processing by the message reassembly unit 42a will be described.

<<Processing>>

Figure 10:
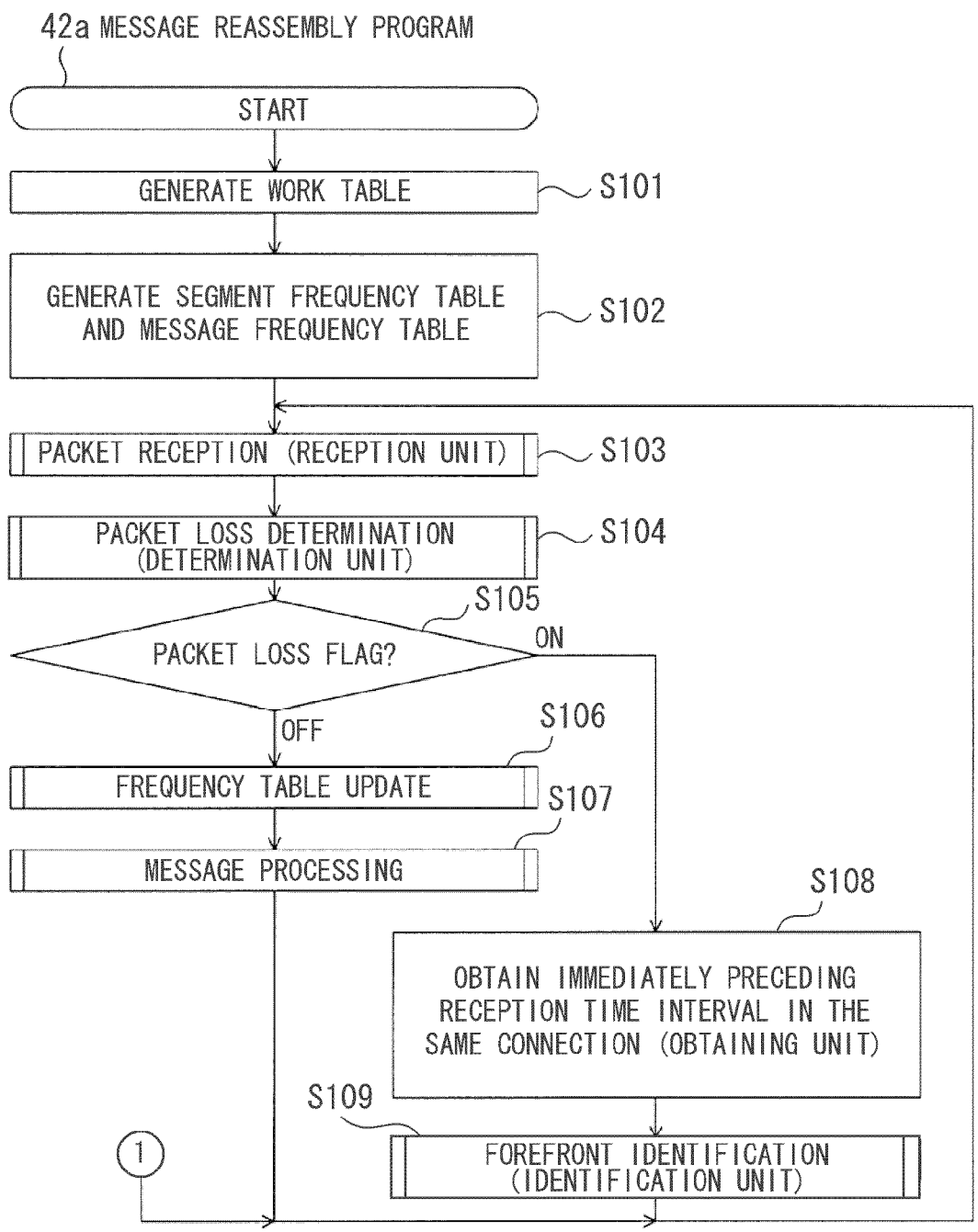
FIG. 10 illustrates the flow of a message reassembly processing.

FIG. 10 illustrates the flow of the message reassembly processing.

After the start of the message reassembly processing, at the first step S101, the message reassembly unit 42a generates one new work table where no record is present. This work table is for recording information on a plurality of TCP connections established between objects to be monitored by the communication status visualization device 40.

Figure 11:
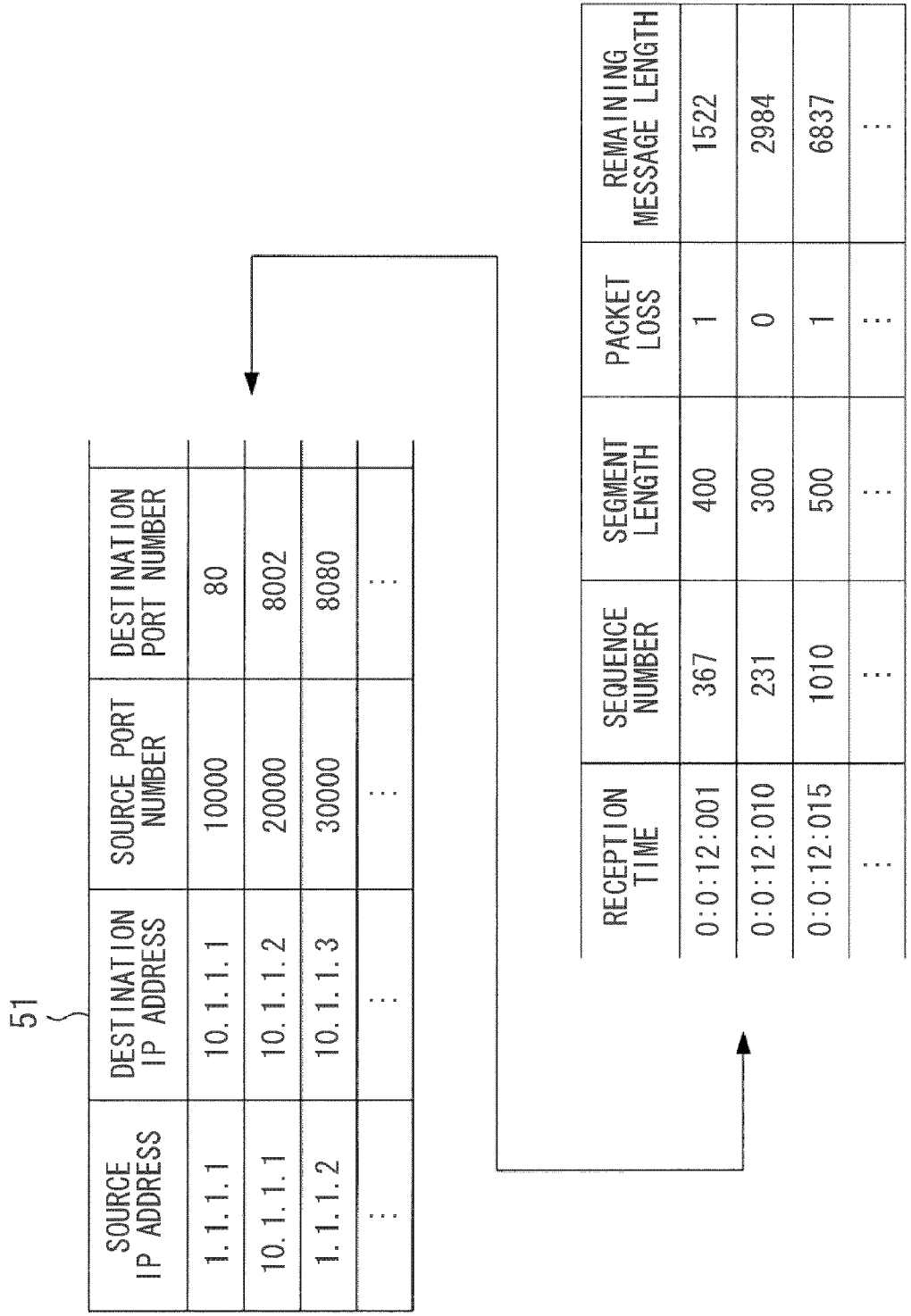
FIG. 11 schematically illustrates a work table.

FIG. 11 schematically illustrates the work table 51.

Each record of the work table 51 has a "source IP address", "destination IP address", "source port number", "destination port number", "reception time", "sequence number", "segment length", "packet loss" and "remaining message length" fields. The "source IP address" and "destination IP address" fields record the source IP address and the destination IP address stored in the IP header (see FIG. 7) of the packet, respectively. The "source port number" and "destination port number" fields record the source port number and the destination port number stored in the TCP header (see FIG. 8) of the packet, respectively. The "reception time" field records the times when the communication status visualization device 40 receives copies of packets flowing between the computers 10 and 20 to be monitored, from the LAN switch 30. The "sequence number" field records the sequence number stored in the TCP header of the packet. The "segment length" field records the overall size of the segment that is left when the IP header and the TCP header are removed from the packet. The "packet loss" field records a packet loss flag representative of whether or not a packet loss has occurred in the TCP connection identified by the combination of the source IP address, the destination IP address, the source port number and the destination port number. In the present embodiment, when a packet loss occurs in the TCP connection, a determination processing unit described later switches the packet loss flag from "0" to "1". The "remaining message length" field records, as the remaining message length, the size of the untransmitted part of the message transmitted in the TCP connection.

After generating the new work table 51 having the field structure as shown in FIG. 11, the message reassembly unit 42a moves the process to step S102 of FIG. 10.

At step S102, the message reassembly unit 42a generates two new frequency tables. The two frequency tables generated at this step are both for recording frequency distributions with respect to the intervals between the reception times of packets continuously received in the same TCP connection. Since the reception time intervals vary continuously, the frequency distributions are obtained by setting a plurality of classes (sections) by equally dividing the range of the times that the reception time intervals can take on, and counting up the frequency (number) of reception time intervals belonging to each class. The first frequency table is for recording the frequency distribution of the reception time intervals between two packets continuously received in the same TCP connection when the segments in the two packets constitute the same message (first frequency distribution). Hereinafter, the first frequency table will be referred to as a segment frequency table 52. The second frequency table is for recording the frequency distribution of the reception time intervals between two packets continuously received in the same TCP connection when the segments in the two packets constitute different messages (second frequency distribution). Hereinafter, the second table will be referred to as a message frequency table 53. Since the segment frequency table 52 is for obtaining the overall frequency distribution, one segment frequency table 52 is generated for a plurality of TCP connections. Likewise, one message frequency table 53 is generated for a plurality of TCP connections.

FIG. 12 schematically illustrates the frequency table 52 (53).

The frequency table 52 (53) has as many records as the previously set classes. FIG. 12 illustrates an example in which a plurality of classes (sections) having a time width of 0.01 msec are set by dividing the range from 0.00 msec to 0.25 msec into 25 equal parts. In the present embodiment, the classes set to obtain the frequency distribution with respect to the reception time intervals are the same in both the frequency tables 52 and 53. Therefore, the segment frequency table 52 and the message frequency table 53 have the same number of records. As shown in FIG. 12, each record of the frequency table 52 (53) has the "class" and "frequency" fields. The "class" field stores information to identify the class (section).

In FIG. 12, the time of the starting point and the time of the end point of the class (section) are stored like "0.00002 sec to 0.00003 sec" in the "class" field. The "frequency" field stores the frequency (number) of reception time intervals belonging to the class. Immediately after the frequency table 52 (53) is generated, in all the records, the value of the "frequency" field is "0" which is the initial value.

After generating the two new frequency tables 52 (53) having the field structure as shown in FIG. 12, the message reassembly unit 42a moves the process to step S103 of FIG. 10.

At step S103, the message reassembly unit 42a calls and executes a packet reception subroutine. The packet reception subroutine is a reception unit for successively receiving packets.

Figure 13:
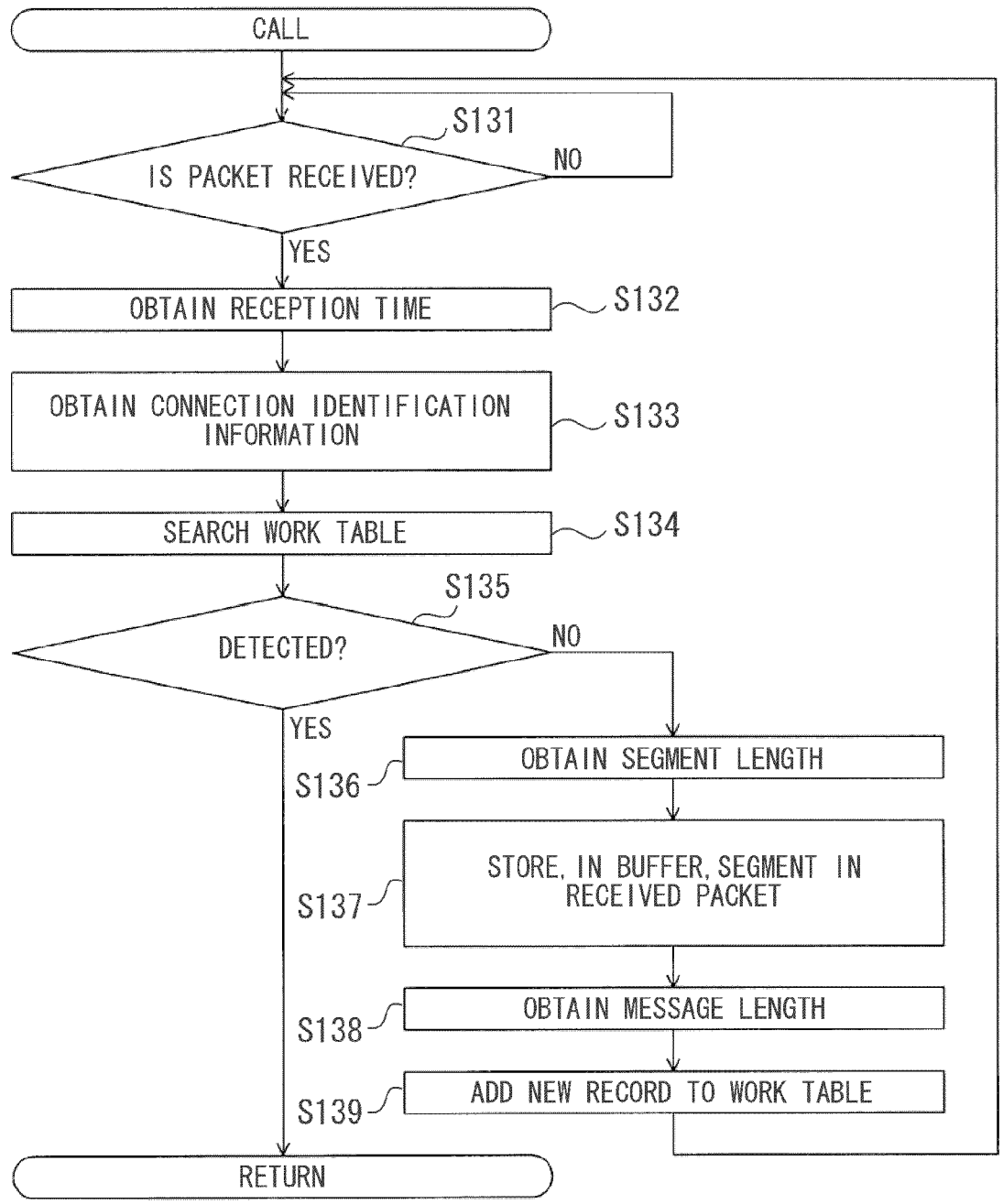
FIG. 13 illustrates the flow of a packet reception subroutine.

FIG. 13 illustrates the flow of the packet reception subroutine.

After the start of the packet reception subroutine, at the first step S131, the reception unit waits until the port mirroring function 32 of the LAN switch 30 receives a copied packet (step S131, No). When receiving a packet (step S131, Yes), the reception unit moves the process to step S132.

At step S132, the reception unit obtains the time when the packet is received at step S131.

At the next step S133, the reception unit obtains connection identification information from the IP header and the TCP header of the packet received at step S131. The connection identification information includes the source IP address, the destination IP address, the source port number and the destination port number. When obtaining the connection identification information, the reception unit moves the process to step S134.

At step S134, the reception unit searches the work table 51 of FIG. 11 with the connection identification information obtained at step S134 as search criteria.

At the next step S135, the reception unit determines whether or not a record satisfying the search criteria is detected from the work table 51 of FIG. 11 by the search at step S134. When no record satisfying the search criteria is detected from the work table 51 of FIG. 11 (step S135, NO), the reception unit causes the process to branch from step S135 to S136.

At step S136, the reception unit obtains the sequence number from the TCP header of the packet received at step S131. The reception unit also obtains the overall length and the header length from the IP header of the packet, obtains the header length from the TCP header, and subtracts both of the header lengths from the overall length, thereby obtaining the segment length.

At the next step S137, the reception unit removes the IP header and the TCP header from the packet received at step S131, and stores the remaining segment in a predetermined buffer provided for storing the segment.

At the next step S138, the reception unit reads the message header contained in the segment stored in the predetermined buffer at step S137, and obtains the message length based on the contents of the read message header. Depending on the protocol of the application layer, the overall size of the message is stored in the message header. In this case, the reception unit obtains the message length by reading the overall size of the message from the message header. Moreover, depending on the protocol, the message content length and the message header length are stored in the message header. In this case, the reception unit obtains the message length by reading the message content length and the message header length from the message header and summing them. Moreover, depending on the protocol, the message length is fixed. In this case, the reception unit uses the message length as it is.

At the next step S139, the reception unit adds, to the work table 51 of FIG. 11, a record containing the reception time obtained at step S132, the connection identification information obtained at step S133, the sequence number and the segment length obtained at step S136 and the message length obtained at step S138. The message length obtained at step S138 is stored in the "remaining message length" field as the remaining message length. The value of the "packet loss" field (packet loss flag) of the record added at this step is "0 (off)". After finishing the addition of the record, the reception unit returns the process to step S131, and returns to the state of waiting until the port mirroring function 32 of the LAN switch 30 receives a copied packet.

On the other hand, when a record satisfying the search criteria is detected from the work table 51 of FIG. 11 by the search at step S135 (step S135, YES), the reception unit ends the packet reception subroutine according to FIG. 13.

When the packet reception subroutine is ended, the message reassembly unit 42a returns to the message reassembly processing of FIG. 10, and moves the process to step S104.

At step S104, the message reassembly unit 42a calls and executes a packet loss determination subroutine. The packet loss determination subroutine is a determination unit for determining whether or not a packet loss has occurred in the same TCP connection as that of the received packet.

Figure 14:
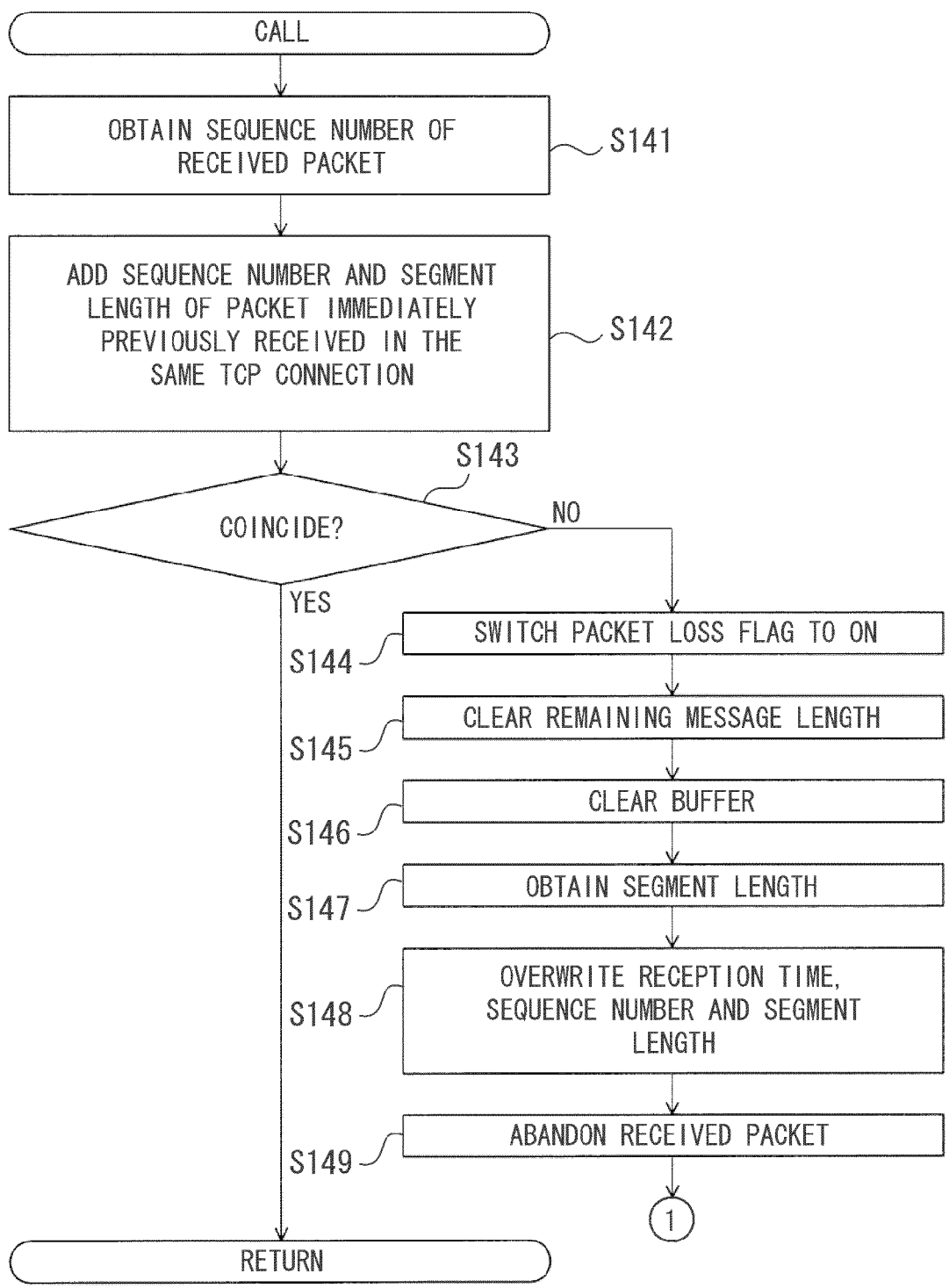
FIG. 14 illustrates the flow of a packet loss determination subroutine.

FIG. 14 illustrates the flow of the packet loss determination subroutine.

After the start of the packet loss determination subroutine, at the first step S141, the determination unit obtains the sequence number from the TCP header of the packet received at step S131 of FIG. 13.

At the next step S142, the determination unit reads the sequence number and the segment length from the record detected by the search at step S134 of FIG. 13. The sequence number and the segment length read at this step are related to the packet received immediately before the packet received at step S131 in the same TCP connection as that of the packet received at step S131. Then, the determination unit obtains the total value by adding the read sequence number and segment length (see FIG. 9).

At the next step S143, the determination unit determines whether the sequence number obtained at step S141 and the total value obtained at step S142 coincide with each other or not. As mentioned above, step S143 is a processing to determine whether a packet loss has occurred or not. When the sequence number obtained at step S141 and the total value obtained at step S142 do not coincide with each other (step S143, NO), determining that a packet loss has occurred, the determination unit causes the process to branch from step S143 to step S144.

At step S144, the determination unit switches the value of the "packet loss" field (packet loss flag) of the record detected by the search at step S134 of FIG. 13 from "0 (off)" to "1 (on)".

At the next step S145, the determination unit clears the value (remaining message length) of the "remaining message" field of the record detected by the search at step S134 of FIG. 13.

At the next step S146, the determination unit clears the predetermined buffer although the reception of all the segments constituting the message to be transferred to the communication application (42b of FIG. 4) has not been completed.

At the next step S147, the determination unit obtains the overall length and the header length from the IP header of the packet received at step S131 of FIG. 13, obtains the header length from the TCP header, and subtracts both of the header lengths from the overall length, thereby obtaining the segment length.

At the next step S148, the determination unit overwrites the value of the "reception time" of the record detected by the search at step S134 of FIG. 13 with the reception time obtained at step S132 of FIG. 13, thereby updating the record. Likewise, the determination unit overwrites the value of the "sequence number" of the record detected by the search at step S134 of FIG. 13 with the sequence number obtained at step S141, thereby updating the record. Likewise, the determination unit overwrites the value of the "segment length" of the record detected by the search at step S134 of FIG. 13 with the segment length obtained at step S147, thereby updating the record.

At the next step S149, the determination unit abandons the packet received at step S131 of FIG. 13 without storing the segment in the packet in the predetermined buffer. Then, the determination unit leaves the packet loss determination subroutine of FIG. 14. Then, the CPU 40g returns to the message reassembly processing of FIG. 10, and returns the process to step S103.

On the other hand, when the sequence number obtained at step S141 and the total value obtained at step S142 coincide with each other (step S143, YES), determining that no packet loss has occurred, the determination unit ends the packet loss determination subroutine according to FIG. 14.

When the packet loss determination subroutine is ended, the CPU 40g returns to the message reassembly processing of FIG. 10, and moves the process to step S105.

At step S105, the CPU 40g determines whether the value (packet loss flag) of the "packet loss" field of the record detected by the search at step S134 of FIG. 13 is "0 (off)" or "1 (on)". When the value (packet loss flag) of the "packet loss" field of the record detected by the search at step S134 of FIG. 13 is "0 (off)", determining that no packet loss has occurred in the same TCP connection as that of the packet received at step S131 of FIG. 13, the CPU 40g moves the process from step S105 to step S106.

At step S106, the message reassembly unit 42a calls and executes a frequency table update subroutine. The frequency table update subroutine is a processing unit for updating the segment frequency table 52 or the message frequency table 53 based on the interval of the reception times of the packet received at step S131 of FIG. 13 and the packet received immediately before the packet received at step S131 in the same TCP connection as that of the packet.

Figure 15:
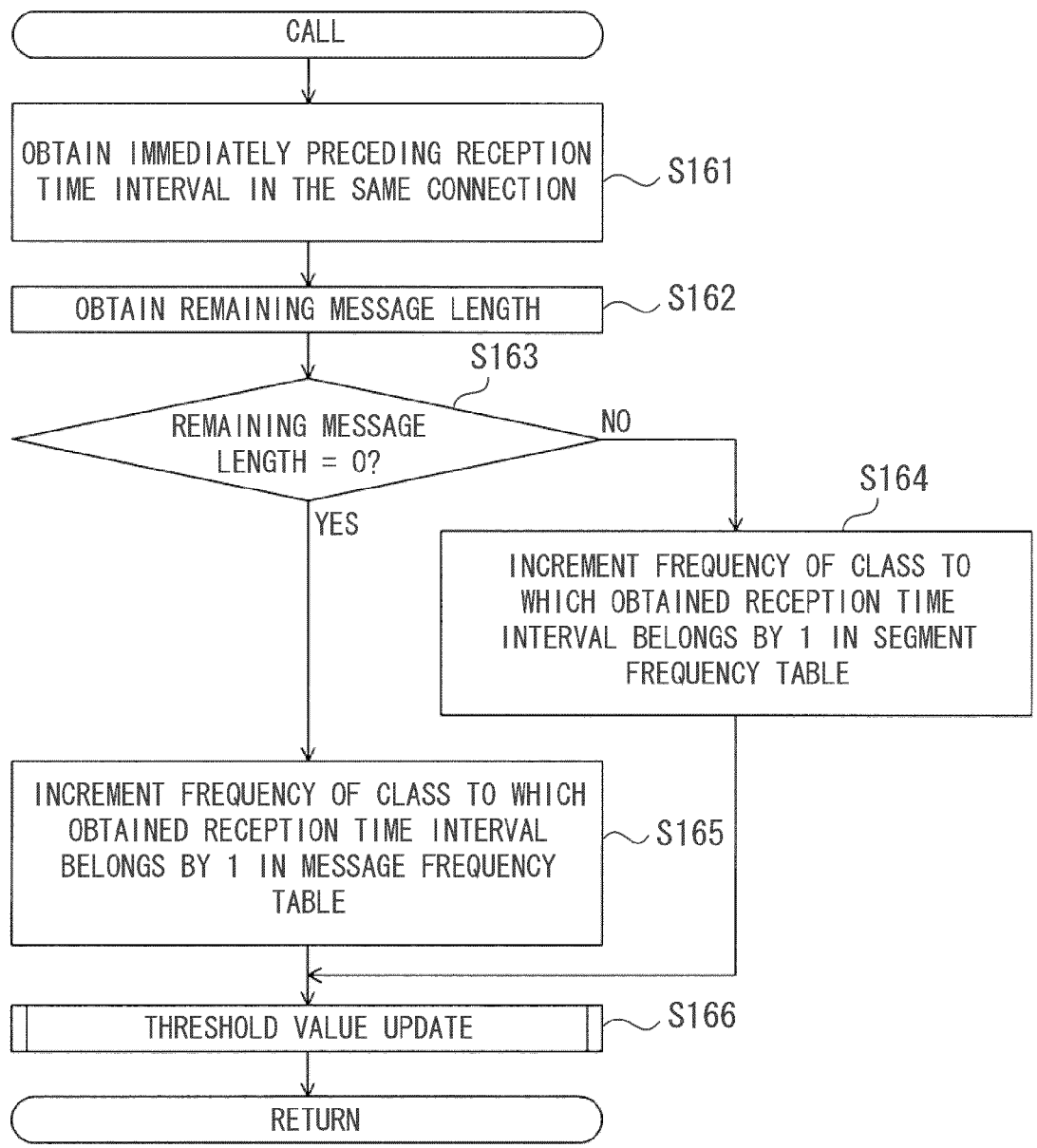
FIG. 15 illustrates the flow of a frequency table update subroutine.

FIG. 15 illustrates the flow of the frequency table update subroutine.

At step S161, the frequency table update unit obtains, as the immediately preceding reception time interval, the reception time interval from the time of the previous packet reception to the time of this packet reception in the same TCP connection as that of the packet received at step S131 of FIG. 13. Specifically, first, the frequency table update unit reads the reception time of the packet previously received in the same TCP connection, from the "reception time" field of the record detected by the search at step S134 of FIG. 13. Then, the CPU 40g obtains the reception time interval by subtracting the previous reception time from the reception time obtained at step S132 of FIG. 13.

At the next step S162, the frequency table update unit obtains the value (remaining message length) of the "remaining message length" field of the record detected by the search at step S134 of FIG. 13.

At the next step S163, the frequency table update unit determines whether the remaining message length obtained at step S162 is zero or not. When the remaining message length obtained at step S162 is not zero (step S163, NO), determining that the segment in the packet received at step S131 of FIG. 13 belongs to the same message as the segment in the packed immediately previously received in the same TCP connection, the frequency table update unit causes the process to branch from step S163 to step S164.

At step S164, in the segment frequency table 52 of FIG. 12, the frequency table update unit identifies the class to which the reception time interval obtained at step S161 belongs, and increments the frequency of the class by one. Then, the frequency table update unit moves the process to step S166.

On the other hand, when the remaining message length obtained at step S162 is zero (step S163, YES), determining that the segment in the packet received at step S131 of FIG. 13 belongs to a different message from the segment in the packet immediately previously received in the same TCP connection, the frequency table update unit causes the process to branch from step S163 to step S165.

At step S165, in the message frequency table 53 of FIG. 12, the frequency table update unit identifies the class to which the reception time interval obtained at step S161 belongs, and increments the frequency of the class by one. Then, the frequency table update unit moves the process to step S166.

At step S166, the frequency table update unit calls and executes a threshold value update subroutine. The threshold value update subroutine is a processing unit for updating a threshold value based on the segment frequency table 52 and the message frequency table 53. Here, the threshold value is one used at later-described step S109 (FIG. 10) to identify the packet containing the segment which is the forefront part of the message from among the other packets.

Figure 16:
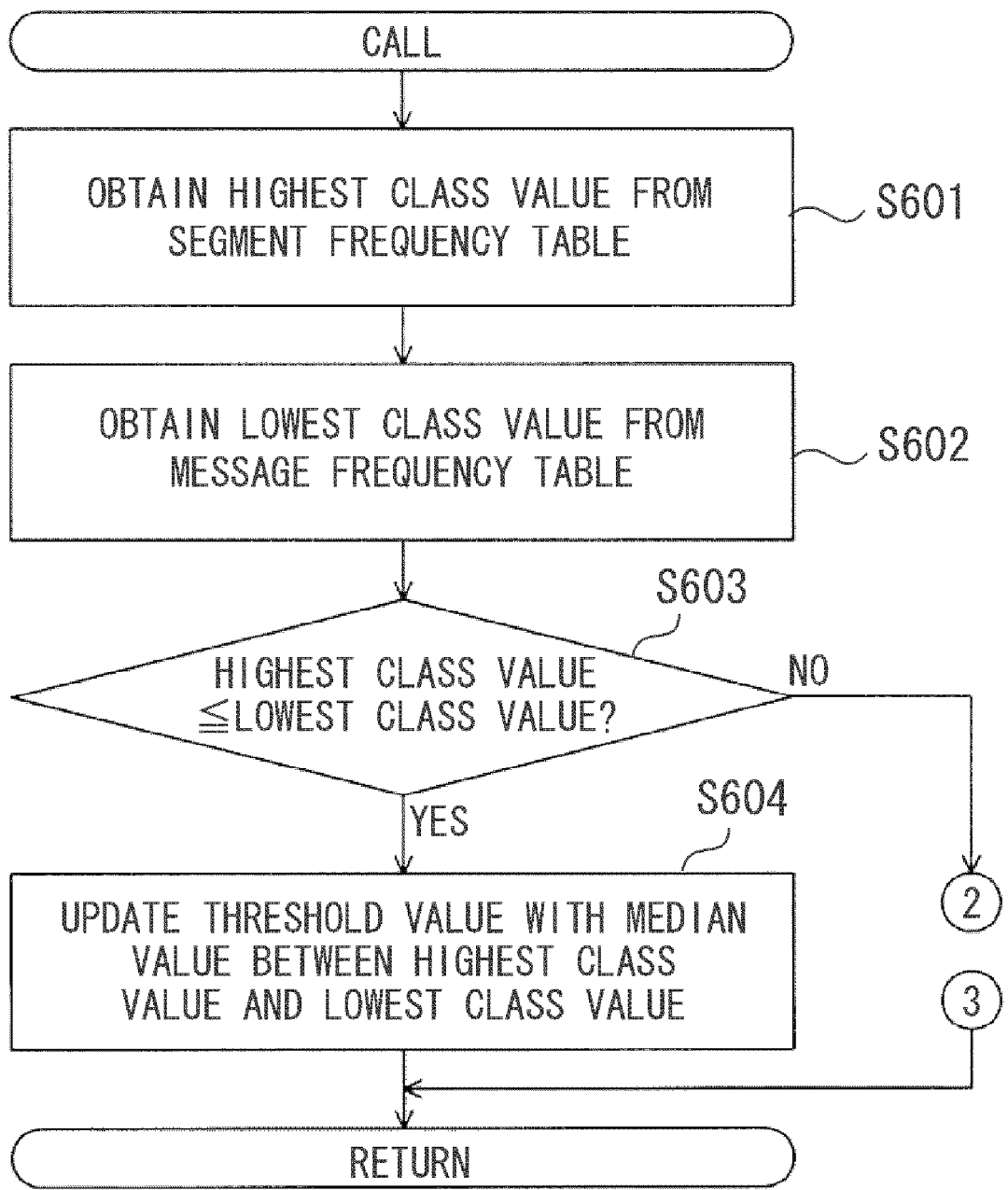
FIG. 16 illustrates the flow of a threshold value update subroutine.
Figure 17:
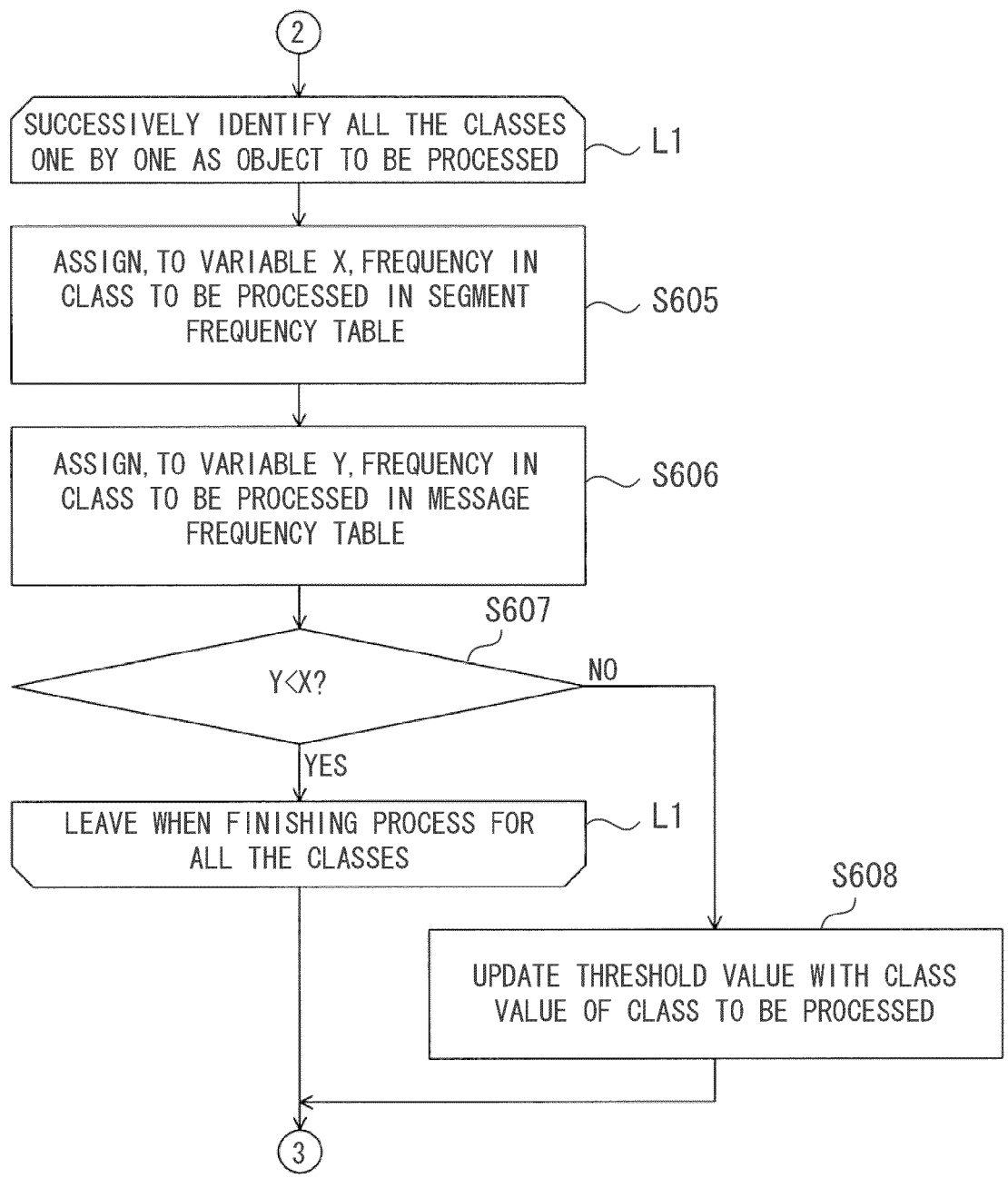
FIG. 17 illustrates the flow of the threshold value update subroutine.

FIGS. 16 and 17 illustrate the flow of the threshold value update subroutine.

At step S601, in the segment frequency table 52 of FIG. 12, the threshold value update unit identifies the class having the highest class value from among the classes having frequencies of not less than one, and obtains the class value. Here, the class value is the average value of the time of the starting point and the time of the end point of the class (interval) in the present embodiment. For example, when the class is "0.00002 sec to 0.00003 sec", the class value is 0.000025 sec. The class value obtained at this step is the highest class value in a histogram which is a graph based on the contents (first frequency distribution) of the segment frequency table 52. Hereinafter, this histogram will be referred to as a segment interval histogram.

At the next step S602, in the message frequency table 53 of FIG. 12, the threshold value update unit identifies the class having the lowest class value from among the classes having frequencies of not less than one, and obtains the class value. The class value obtained at this step is the lowest class value in a histogram which is a graph based on the contents (second frequency distribution) of the message frequency table 53. Hereinafter, this histogram will be referred to as message interval histogram.

At the next step S603, the threshold value update unit determines whether the highest class value identified at step S601 is not more than the lowest class value identified at step S602 or not. When the highest class value identified at step S601 is not more than the lowest class value identified at step S602 (step S603, YES), determining that there is no point of intersection when the segment interval histogram and the message interval histogram are each expressed as a line graph, the threshold value update unit moves the process from step S603 to S604.

At step S604, the threshold value update unit calculates the median value between the highest class value identified at step S601 and the lowest class value identified at step S602. Then, the threshold value update unit updates the threshold value by changing the threshold value used at later-described step S109 (FIG. 10) to the same value as the median value. Then, the threshold value update unit ends the threshold value update subroutine according to FIGS. 16 and 17.

On the other hand, when the highest class value identified at step S601 is higher than the lowest class value identified at step S602 (step S603, NO), determining that there is a point of intersection when the segment interval histogram and the message interval histogram are each expressed as a line graph, the threshold value update unit causes the process to branch from step S603, and executes a first processing loop L1 of FIG. 17.

In the first processing loop L1, while successively identifying all the classes set in the two frequency tables 52 and 53 one by one as the object to be processed, the threshold value update unit executes the process from step S605 to S607 for each class identified as the object to be processed.

At step S605, the threshold value update unit assigns, to a variable X, the frequency in the record of the class to be processed in the segment frequency table 52 of FIG. 12.

At the next step S606, the threshold update unit assigns, to a variable Y, the frequency in the record of the class to be processed in the message frequency table 53 of FIG. 12.

At the next step S607, the threshold value update unit determines whether the value assigned to the variable X is higher than the value assigned to the variable Y or not. When the value assigned to the variable X is higher than the value assigned to the variable Y, determining that in a coordinate system having the class value on the horizontal axis and having the frequency on the vertical axis, the coordinate value of the class value axis of the point of intersection when the segment interval histogram and the message interval histogram are each expressed as a line graph is higher than the class value of the class to be processed, the threshold value update unit ends the round of this object to be processed in the first processing loop L1.

When finishing the process from S605 to S607 for all the classes set in the two frequency tables 52 and 53, the threshold value update unit leaves the first processing loop L1, and ends the threshold value update subroutine according to FIGS. 16 and 17.

On the other hand, when the value assigned to the variable X is not more than the value assigned to the variable Y when any of the classes is identified as the object to be processed of the first processing loop L1 (step S607, NO), determining that in the coordinate system having the class value on the horizontal axis and having the frequency as the vertical axis, the coordinate value of the class value axis of the point of intersection when the segment interval histogram and the message interval histogram are each expressed as a line graph is not more than the class value of the class to be processed, the threshold value update unit causes the process to branch from step S607 to thereby leave the first processing loop L1. After leaving the first processing loop L1, the threshold value update unit moves the process to step S608.

At step S608, the threshold value update unit updates the threshold value by changing the threshold value used at later-described step S109 (FIG. 10) to the same value as the class value of the class to be processed. Then, the threshold value update unit ends the threshold value update subroutine according to FIGS. 16 and 17.

When the threshold value update subroutine is ended, the frequency table update unit returns to the frequency table update subroutine of FIG. 15, and ends the frequency table update subroutine.

When the frequency table update subroutine is ended, the message reassembly unit 42a returns to the message reassembly processing of FIG. 10, and moves the process to step S107.

At step S107, the message reassembly unit 42a calls and executes a message processing subroutine. The message processing subroutine is a processing unit for, when all the segments constituting the message to be transferred to the communication unit (42b of FIG. 4) have been received, generating the message and transferring it to the communication unit.

Figure 18:
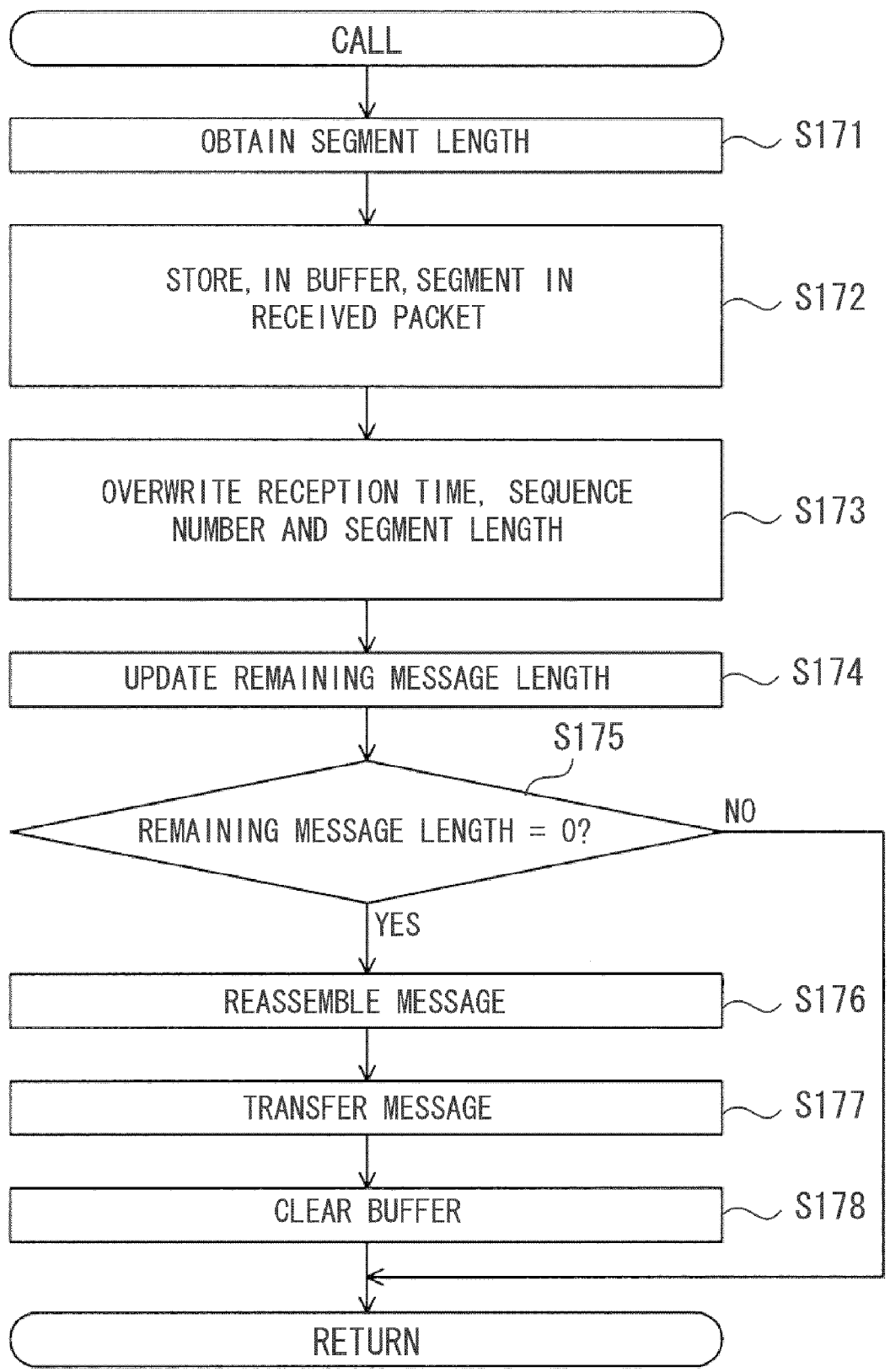
FIG. 18 illustrates the flow of a message processing subroutine.

FIG. 18 illustrates the flow of the message processing subroutine.

At step S171, the message processing unit obtains the overall length and the header length from the IP header of the packet received at step S131 of FIG. 13, obtains the header length from the TCP header, and subtracts both of the header lengths from the overall length, thereby obtaining the segment length.

At the next step S172, the message processing unit removes the IP header and the TCP header from the packet received at step S131 of FIG. 13, and stores the remaining segment in a predetermined buffer provided for storing the segment.

At the next step S173, the message processing unit overwrites the values of the "reception time", "sequence number" and "segment length" fields of the record detected by the search at step S134 of FIG. 13 with the reception time obtained at step S132 of FIG. 13, the sequence number obtained at step S141 of FIG. 14 and the segment length obtained at step S173, respectively, thereby updating the record.

At the next step S174, the message processing unit calculates a value obtained by subtracting the segment length obtained at step S172 from the value of the "remaining message length" field of the record detected by the search at step S134 of FIG. 13, and overwrites the value of the field with the calculated value, thereby updating the remaining message length.

At the next step S175, the message processing unit determines whether the remaining message length is zero as a result of the update at step S174 or not. When the remaining message length is not zero as a result of the update at step S174, determining that the reception of all the segments constituting the message to be transferred to the communication application (42b of FIG. 4) has not been completed, the message processing unit causes the process to branch from step S175, and ends the message processing subroutine according to FIG. 18. On the other hand, when the remaining message length is zero as a result of the update at step S174, the message processing unit moves the process from step S175 to step S176.

At step S176, the message processing unit reassembles the message based on all the segments stored in the predetermined buffer.

At the next step S177, the message processing unit transfers the message generated by the reassembly at step S176 to the communication unit (42b of FIG. 4).

At the next step S178, the message processing unit clears the predetermined buffer in preparation for the next reception of the message. Then, the message processing unit ends the message processing subroutine according to FIG. 18.

When the message processing subroutine is ended, the message reassembly unit 42a returns to the message reassembly processing of FIG. 10, and returns the process to step S103.

On the other hand, when the value (packet loss flag) of the "packet loss" field of the record detected by the search at step S134 of FIG. 13 is "1 (on)" (step S105, NO), determining that the reassembly of the message is impossible due to the influence of a packet loss in the same TCP connection as that of the packet received at step S131 of FIG. 13, the message reassembly unit 42a moves the process from step S105 to step S108.

At step S108, the obtaining unit obtains, as the immediately preceding reception time interval, the reception time interval from the time of the previous packet reception to the time of this packet reception in the same TCP connection as that of the packet received at step S131 of FIG. 13. Specifically, first, the obtaining unit reads the reception time of the packet previously received in the same TCP connection, from the "reception time" field of the record detected by the search at step S134 of FIG. 13. Then, the obtaining unit obtains the reception time interval by subtracting the previous reception time from the reception time obtained at step S132 of FIG. 13.

At the next step S109, the obtaining unit calls and executes a forefront identification subroutine. The forefront identification subroutine is a processing unit for identifying the packet containing the forefront segment of a plurality of segments constituting one message from among the successively received packets (hereinafter, referred to as identification unit).

Figure 19:
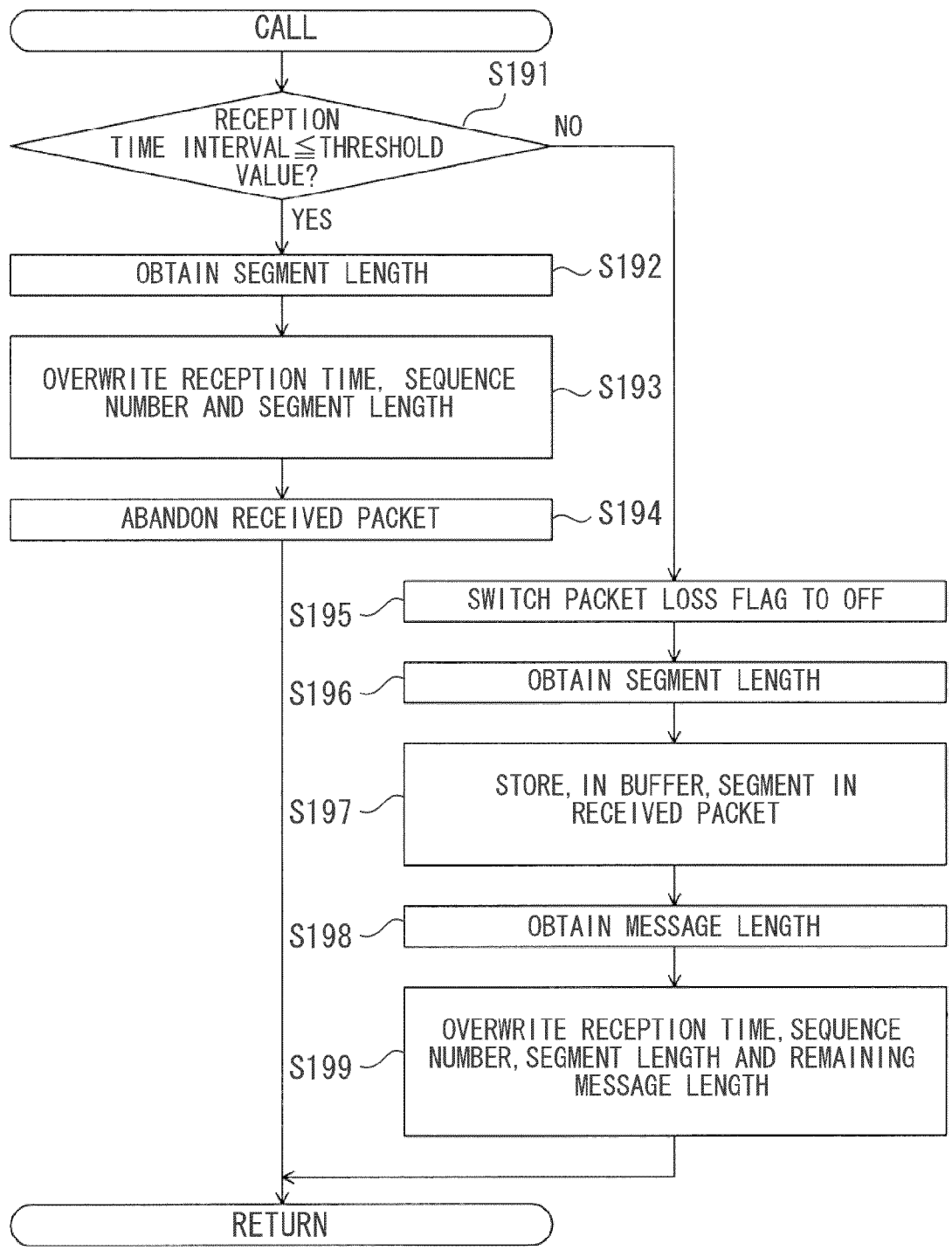
FIG. 19 illustrates the flow of a forefront identification subroutine.

FIG. 19 illustrates the flow of the forefront identification subroutine.

At step S191, the identification unit determines whether or not the reception time interval obtained at step S108 of FIG. 10 is not more than the threshold value obtained at step S604 of FIG. 16 or step S608 of FIG. 17. When the reception time interval obtained at step S108 of FIG. 10 is not more than the threshold value obtained at step S604 of FIG. 16 or step S608 of FIG. 17 (step S191, YES), determining that the packet received at step S131 of FIG. 13 does not contain the forefront segment of the message, the identification unit moves the process from step S191 to S192.

At step S192, the identification unit obtains the overall length and the header length from the IP header of the packet received at step S131 of FIG. 13, obtains the header length from the TCP header, and subtracts both of the header lengths from the overall length, thereby obtaining the segment length.

At the next step S193, the identification unit overwrites the values of the "reception time", "sequence number" and "segment length" fields of the record detected by the search at step S134 of FIG. 13 with the reception time obtained at step S132 of FIG. 13, the sequence number obtained at step S141 of FIG. 14 and the segment length obtained at step S192, respectively, thereby updating the record.

At the next step S194, the identification unit abandons the packet received at step S131 of FIG. 13 without storing the segment in the packet in the predetermined buffer. Then, the identification unit ends the forefront identification subroutine according to claim 19.

On the other hand, when the reception time interval obtained at step S108 of FIG. 10 is higher than the threshold value obtained at step S604 of FIG. 16 or step S608 of FIG. 17 (step S191, NO), determining that the packet received at step S131 of FIG. 13 contains the forefront segment of the message, the identification unit causes the process to branch from step S191 to step S195.

At step S195, the identification unit switches the value (packet loss flag) of the "packet loss" field of the record detected by the search at step S134 of FIG. 13, from "1 (on)" to "0 (off)".

At the next step S196, the identification unit obtains the overall length and the header length from the IP header of the packet received at step S131 of FIG. 13, obtains the header length from the TCP header, and subtracts both of the header lengths from the overall length, thereby obtaining the segment length.

At the next step S197, the identification unit removes the IP header and the TCP header from the packet received at step S131 of FIG. 13, and stores the remaining segment in a predetermined buffer.

At the next step S198, the identification unit reads the message header contained in the segment stored in the buffer at step S197, and obtains the message length based on the contents of the read message header. As mentioned above, when the protocol of the application layer is one where the overall size of the message is stored in the message header, the identification unit reads the overall size of the message from the message header. When the protocol of the application layer is one where the message content length and the message header length are stored in the message header, the identification unit reads the message content length and the message header length from the message header, and adds them. When the protocol of the application layer is one where the message length is fixed, the identification unit uses the message length as it is.

At the next step S199, the identification unit overwrites the value of the "reception time" of the record detected by the search at step S134 of FIG. 13 with the reception time obtained at step S132 of FIG. 13, thereby updating the record. Likewise, the identification unit overwrites the value of the "sequence number" of the record detected by the search at step S134 of FIG. 13 with the sequence number obtained at step S141 of FIG. 14, thereby updating the record. Likewise, the identification unit overwrites the value of the "segment length" of the record detected by the search at step S134 of FIG. 13 with the segment length obtained at step S196, thereby updating the record. Likewise, the identification unit overwrites the value of the "remaining message length" of the record detected by the search at step S134 of FIG. 13 with the message length obtained at step S198, thereby updating the record. The message length obtained at step S198 is written over the value of the "remaining message length" field as the remaining message length. Moreover, since the process passes through step S195 at this point in time, the value (packet loss flag) of the "packet loss" field is "0 (off)". After finishing the update of the record, the identification unit ends the forefront identification subroutine according to FIG. 19.

When the forefront identification subroutine is ended, the message reassembly unit 42a returns the process to step S103 of FIG. 10.

<<Operation and Effects>>

When the communication status visualization unit 42 is on, every time a copy of a packet flowing between the computers 10 and 20 to be monitored is received from the LAN switch 30, the communication status visualization device 40 of the present embodiment identifies the TCP connection to which the packet belongs, and checks the occurrence of a packet loss in the TCP connection.

When the occurrence of a packet loss is recognized in any TCP connection, the communication status visualization device 40 abandons packets related to the TCP connection until a packet where it is estimated that the forefront segment of the segments constituting a message is contained is received. Then, when receiving a packet where it can be estimated that the forefront segment is contained, the communication status visualization device 40 resumes message reassembly.

As described above, according to the communication status visualization device 40 of the present embodiment, even after the occurrence of a packet loss, the packet containing the forefront segment can be identified, and message reassembly can be performed.

Whether the forefront segment of the segments constituting a message is contained in a packet or not is determined based on whether the interval between the reception time of the packet and the immediately previously received packet in the same connection as that of the packet is higher than a predetermined threshold value or not. The threshold value is updated based on statistics on the reception time interval.

Specifically, the communication status visualization device 40 updates, every time a packet is received, the segment frequency table 52 related to the reception time interval between a pair of continuously received packets containing segments belonging to the same message, and updates the threshold value every time a packet is received. Likewise, the communication status visualization device 40 updates, every time a packet is received, the message frequency table 53 related to the reception time interval between a pair of continuously received packets containing segments belonging to different messages, and updates the threshold value every time a packet is received.

Figure 20:
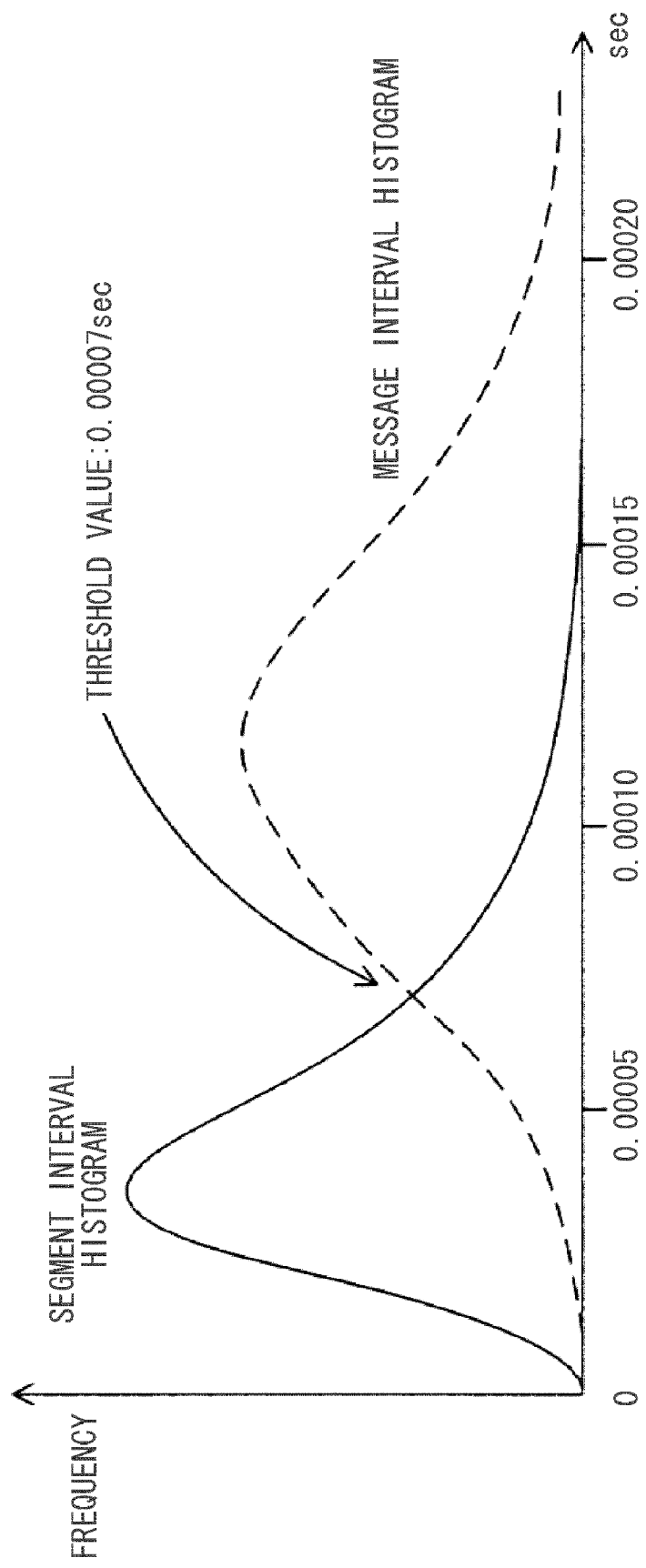
FIG. 20 illustrates line graphs of a segment interval histogram and a message interval histogram.

A case will be considered where the highest class value of the segment interval histogram which is a graph based on the contents (first frequency distribution) of the segment frequency table 52 is higher than the lowest class value of the message interval histogram which is a graph based on the contents (second frequency distribution) of the message frequency table 53. In this case, the threshold value is, as shown in FIG. 20, the class value that is the closest, of the class values lower than the coordinate value, to the coordinate value of the class value axis of the point of intersection of the line graph of the segment interval histogram and the line graph of the message interval histogram (0.07 msec in FIG. 20).

Figure 21:
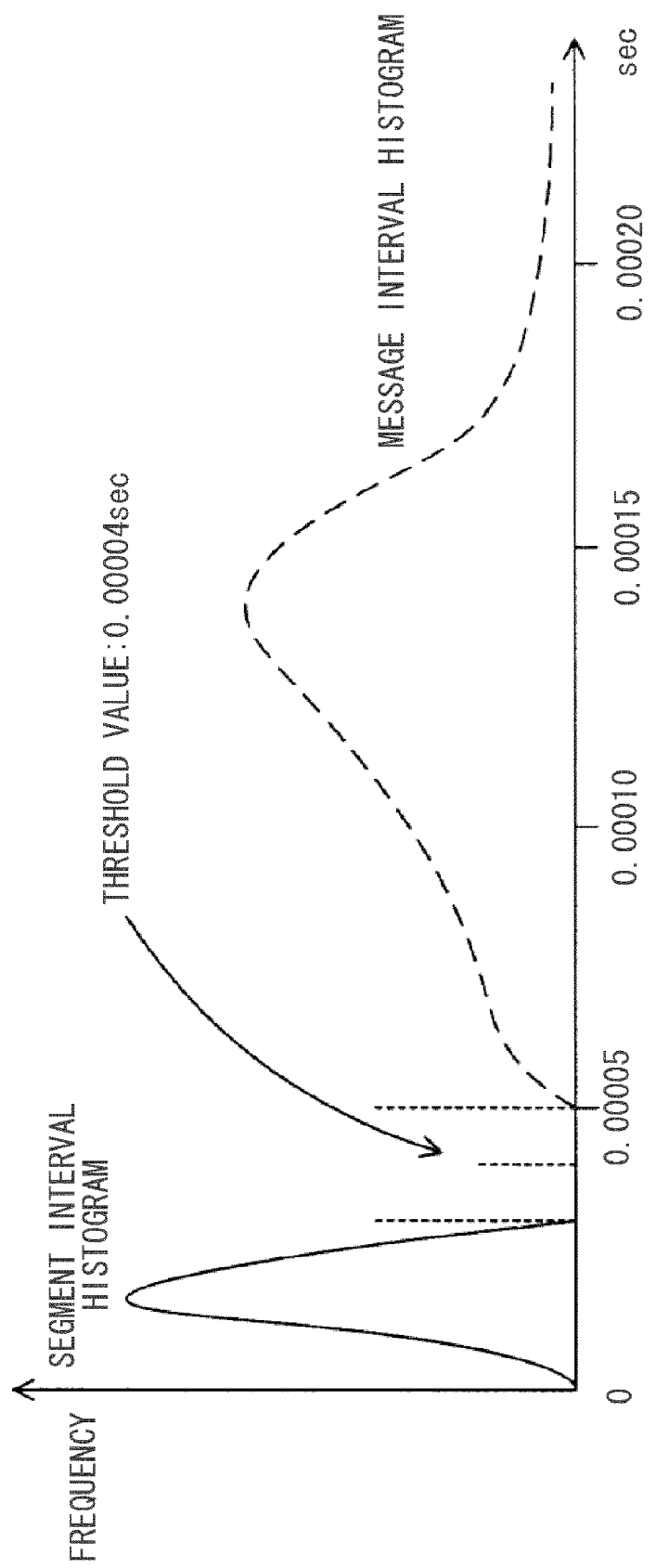
FIG. 21 illustrates line graphs of the segment interval histogram and the message interval histogram.

On the other hand, when the highest class value of the segment interval histogram is not more than the lowest class value of the message interval histogram, the threshold value is, as shown in FIG. 21, the median value between the highest grass value of the segment interval histogram and the lower class value of the message interval histogram (0.04 msec in FIG. 21).

In a case where after the communication application requests a lower communication layer to transmit a message, not a kernel (TCP/IP suite in the operating system) but hardware divides the message into segments and generates packets, the division into segments and the generation of packets are performed approximately at wire speed (theoretically highest communication speed). The transmission intervals of packets containing segments belonging to the same message are extremely short. For this reason, there can be cases where the highest class value of the segment interval histogram is not more than the lowest class value of the message interval histogram (see FIG. 21).

What is claimed is:

1. A non-transitory computer-readable medium storing a packet identification program containing instructions executable on a computer, the program causing the computer to execute:

a reception procedure that successively receives packets;

an obtaining procedure that obtains an interval of reception times between the received packet and a packet received immediately before the received packet, in the same connection as that of the received packet; and an identification procedure that identifies the packet received by the reception procedure, as a packet containing a forefront segment of a plurality of segments constituting one message when the reception time interval obtained by the obtaining procedure is longer than a predetermined threshold value.

2. The non-transitory computer-readable medium according to claim 1, the program further causing the computer to execute:
a determination procedure that determines, every time the reception procedure receives a packet, whether a packet loss has occurred in the same connection as that of the received packet or not,
wherein when the determination procedure determines that a packet loss has occurred, the obtaining procedure obtains the reception time interval every time the reception procedure receives a packet related to the connection where the packet loss has occurred.

3. The non-transitory computer-readable medium according to claim 1, wherein the predetermined threshold value is determined based on a first frequency distribution related to the reception time interval between a pair of continuously received packets containing segments belonging to the same message, and a second frequency distribution related to the reception time interval between a pair of continuously received packets containing segments belonging to different messages.

4. The non-transitory computer-readable medium according to claim 3, wherein when a highest class value of the first frequency distribution is higher than a lowest class value of the second frequency distribution, the predetermined threshold value is a class value closest to a point of intersection of a line graph of the first frequency distribution and a line graph of the second frequency distribution.

5. The non-transitory computer-readable medium according to claim 3, wherein when a highest class value of the first frequency distribution is not more than a lowest class value of the second frequency distribution, the predetermined threshold value is a median value between the highest class value and the lowest class value.

6. The non-transitory computer-readable medium according to claim 1, wherein the reception procedure successively receives copied packets from a relay device that copies packets flowing between a plurality of computers to be monitored.

7. A packet identification method executed by a computer, the method comprising:
a reception procedure for successively receiving packets;
an obtaining procedure for obtaining an interval of reception times between the received packet and a packet received immediately before the received packet, in the same connection as that of the received packet; and
an identification procedure for identifying the packet received in the reception procedure, as a packet containing a forefront segment of a plurality of segments constituting one message when the obtained reception time interval is longer than a predetermined threshold value.

8. The method according to claim 7, further comprising:
a determination procedure for determining, every time a packet is received, whether a packet loss has occurred in the same connection as that of the received packet or not,
wherein when it is determined that a packet loss has occurred, in the obtaining procedure, the reception time interval is obtained every time a packet related to the connection where the packet loss has occurred is received in the reception procedure.

9. The method according to claim 7, wherein the predetermined threshold value is determined based on a first frequency distribution related to the reception time interval between a pair of continuously received packets containing segments belonging to the same message, and a second frequency distribution related to the reception time interval between a pair of continuously received packets containing segments belonging to different messages.

10. The method according to claim 9, wherein when a highest class value of the first frequency distribution is higher than a lowest class value of the second frequency distribution, the predetermined threshold value is a class value closest to a point of intersection of a line graph of the first frequency distribution and a line graph of the second frequency distribution.

11. The method according to claim 9, wherein when a highest class value of the first frequency distribution is not more than a lowest class value of the second frequency distribution, the predetermined threshold value is a median value between the highest class value and the lowest class value.

12. The method according to claim 7, wherein in the reception procedure, copied packets are successively received from a relay device that copies packets flowing between a plurality of computers to be monitored.

13. A packet identification device comprising:
a reception unit that successively receives packets;
an obtaining unit that obtains an interval of reception times between the received packet and a packet received immediately before the received packet, in the same connection as that of the received packet; and
an identification unit that identifies the received packet as a packet containing a forefront segment of a plurality of segments constituting one message when the obtained reception time interval is longer than a predetermined threshold value.

14. The device according to claim 13, further comprising:
a determination unit that determines, every time a packet is received, whether a packet loss has occurred in the same connection as that of the received packet or not,
wherein when the determination unit determines that a packet loss has occurred, the obtaining unit obtains the reception time interval every time the reception unit receives a packet related to the connection where the packet loss has occurred.

15. The device according to claim 13, wherein the predetermined threshold value is determined based on a first frequency distribution related to the reception time interval between a pair of continuously received packets containing segments belonging to the same message, and a second frequency distribution related to the reception time interval between a pair of continuously received packets containing segments belonging to different messages.

16. The device according to claim 15, wherein when a highest class value of the first frequency distribution is higher than a lowest class value of the second frequency distribution, the predetermined threshold value is a class value closest to a point of intersection of a line graph of the first frequency distribution and a line graph of the second frequency distribution.

17. The device according to claim 15, wherein when a highest class value of the first frequency distribution is not more than a lowest class value of the second frequency distribution, the predetermined threshold value is a median value between the highest class value and the lowest class value.

18. The device according to claim 13, wherein the reception unit successively receives copied packets from a relay device that copies packets flowing between a plurality of computers to be monitored.

* * * * *